United States Patent
Kurozumi et al.

(10) Patent No.: US 8,182,950 B2
(45) Date of Patent: May 22, 2012

(54) METAL OXIDE ELECTROCATALYST, USE THEREOF, AND PROCESS FOR PRODUCING METAL OXIDE ELECTROCATALYSTS

(75) Inventors: Tadatoshi Kurozumi, Chiba (JP); Toshikazu Shishikura, Chiba (JP); Hiroshi Konuma, Chiba (JP)

(73) Assignee: Showa Denko K.K., Tokyo (JP)

( * ) Notice: Subject to any disclaimer, the term of this patent is extended or adjusted under 35 U.S.C. 154(b) by 299 days.

(21) Appl. No.: 12/671,642

(22) PCT Filed: Jul. 23, 2008

(86) PCT No.: PCT/JP2008/063215
§ 371 (c)(1),
(2), (4) Date: Feb. 1, 2010

(87) PCT Pub. No.: WO2009/017011
PCT Pub. Date: Feb. 5, 2009

(65) Prior Publication Data
US 2011/0229793 A1    Sep. 22, 2011

(30) Foreign Application Priority Data
Jul. 31, 2007   (JP) ................... 2007-198853

(51) Int. Cl.
*B01J 23/00* (2006.01)
*C01B 13/14* (2006.01)
*H01B 1/02* (2006.01)
*H01M 4/90* (2006.01)
*H01M 8/10* (2006.01)

(52) U.S. Cl. ..... 429/400; 429/483; 429/488; 423/592.1; 502/349; 502/353

(58) Field of Classification Search .................. 502/349, 502/353; 429/400, 483, 488; 423/592.1
See application file for complete search history.

(56) References Cited

U.S. PATENT DOCUMENTS

| 2003/0175562 A1 | 9/2003 | Taguchi et al. |
| 2006/0001012 A1 | 1/2006 | Suzuki et al. |
| 2006/0018821 A1 | 1/2006 | Suzuki et al. |
| 2007/0259267 A1 | 11/2007 | Ota et al. |
| 2011/0229793 A1* | 9/2011 | Kurozumi et al. ............ 429/482 |

FOREIGN PATENT DOCUMENTS

| JP | 2002-226204 A | 8/2002 |
| JP | 2004-095263 A | 3/2004 |
| JP | 2005-063677 A | 3/2005 |
| JP | 2006-299388 A | 11/2006 |
| JP | 2007-035298 A | 2/2007 |
| WO | 2005/019109 A1 | 3/2005 |
| WO | 2005/080254 A1 | 9/2005 |
| WO | 2006/019128 A1 | 2/2006 |
| WO | 2007/072665 A1 | 6/2007 |

OTHER PUBLICATIONS

Kagaku Daijiten (Chemical Dictionary), vol. 3 edited by Kagaku Daijiten Editorial Committee, compact edition, 38th impression, Kyoritsu Shuppan Co., Ltd., Oct. 1, 2003, pp. 920 and 929.

* cited by examiner

*Primary Examiner* — Timothy Vanoy
(74) *Attorney, Agent, or Firm* — Sughrue Mion, PLLC

(57) ABSTRACT

A metal oxide electrode catalyst which includes a metal oxide (Y) obtained by heat treating a metal compound (X) under an oxygen-containing atmosphere. The valence of the metal in the metal compound (X) is smaller than the valence of the metal in the metal oxide (Y). Further, the metal oxide electrocatalyst has an ionization potential in the range of 4.9 to 5.5 eV.

19 Claims, 13 Drawing Sheets

[Fig. 1]
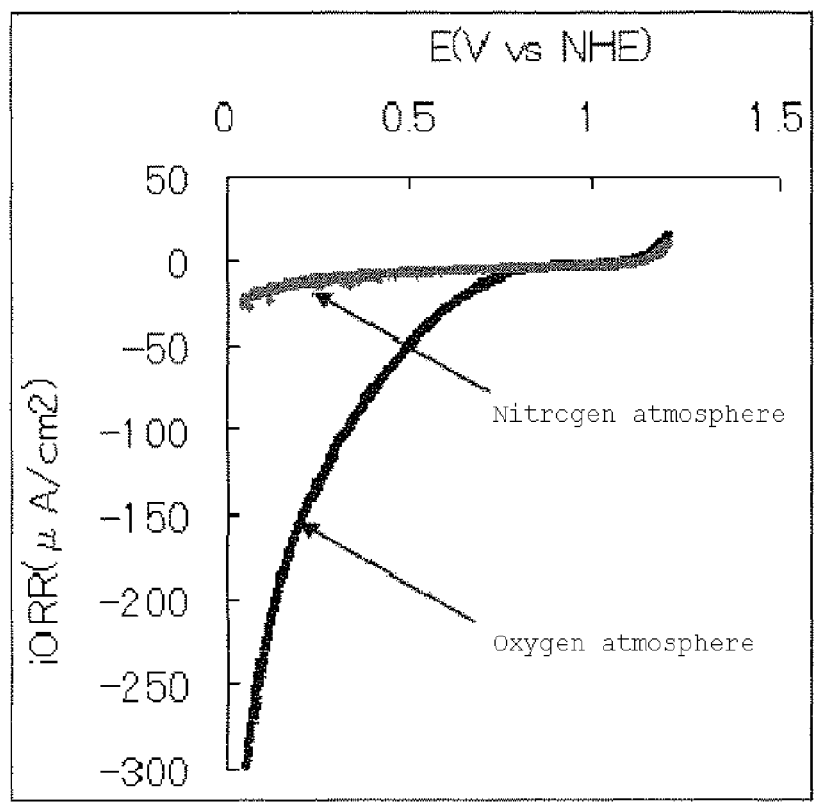
[Fig. 2]
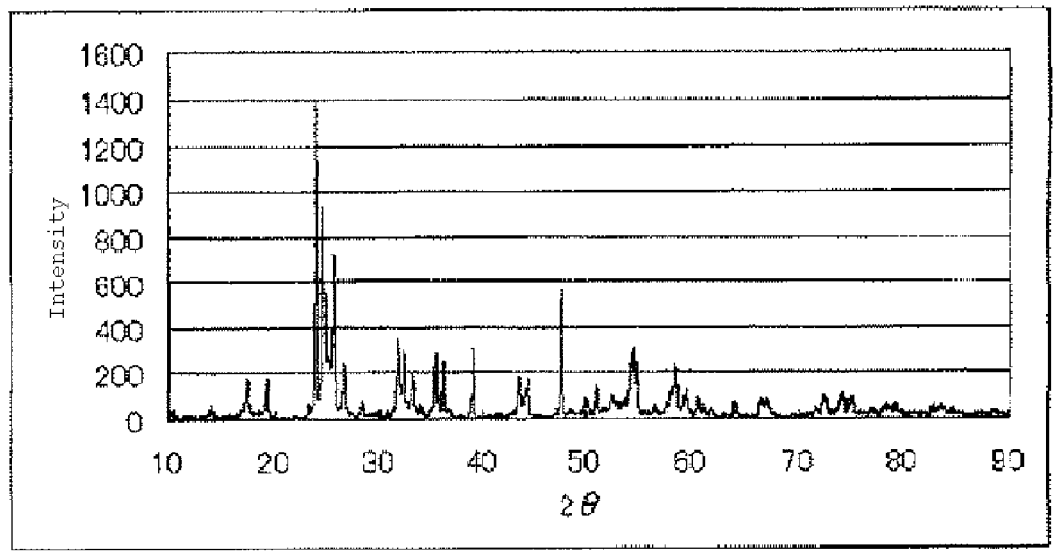

[Fig. 3]
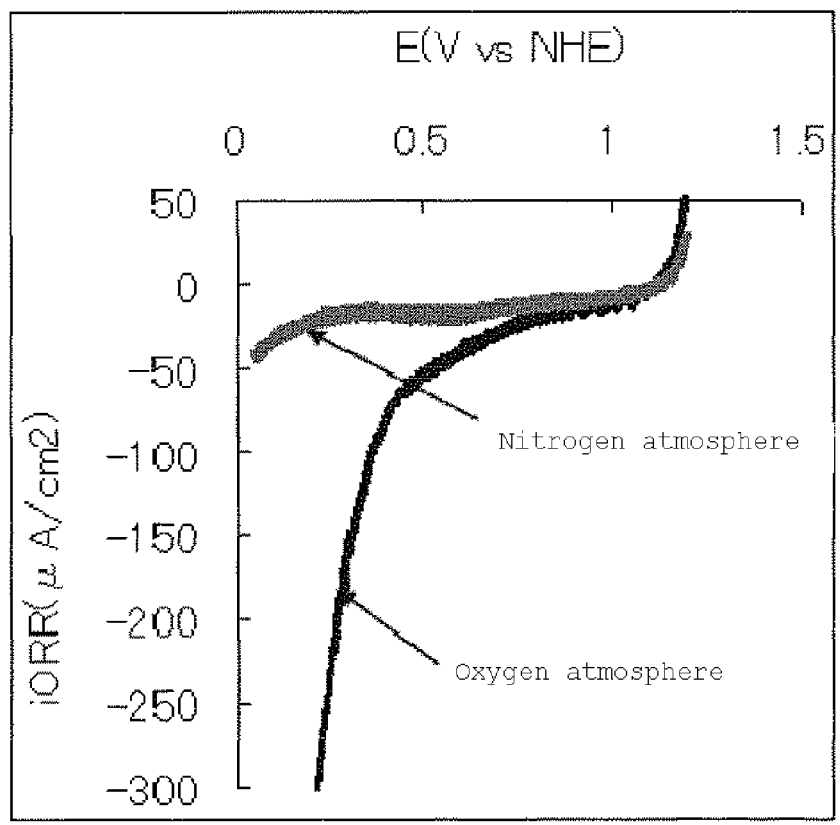
[Fig. 4]
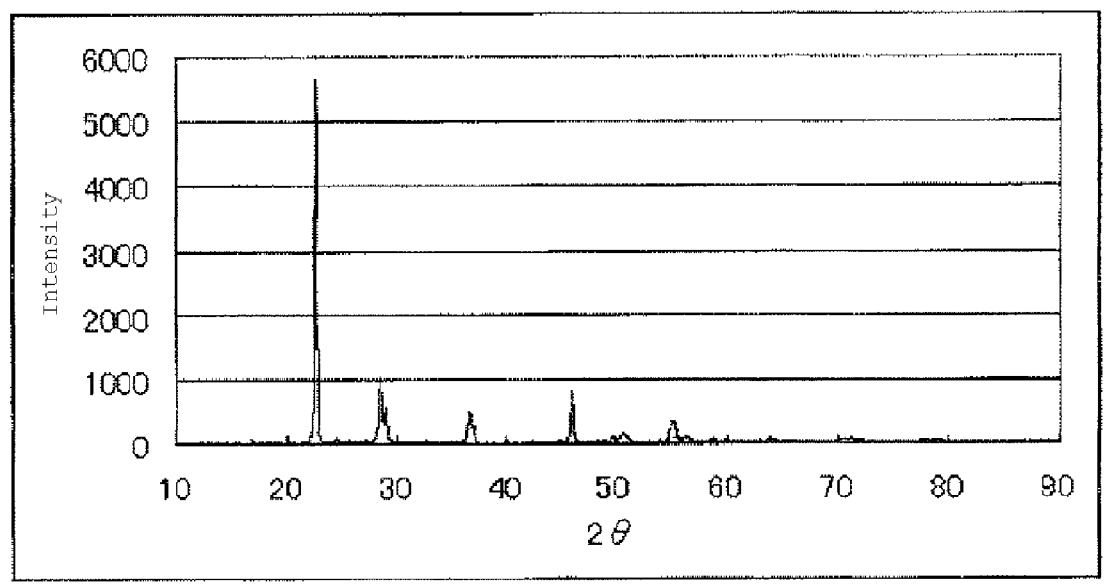

[Fig. 5]
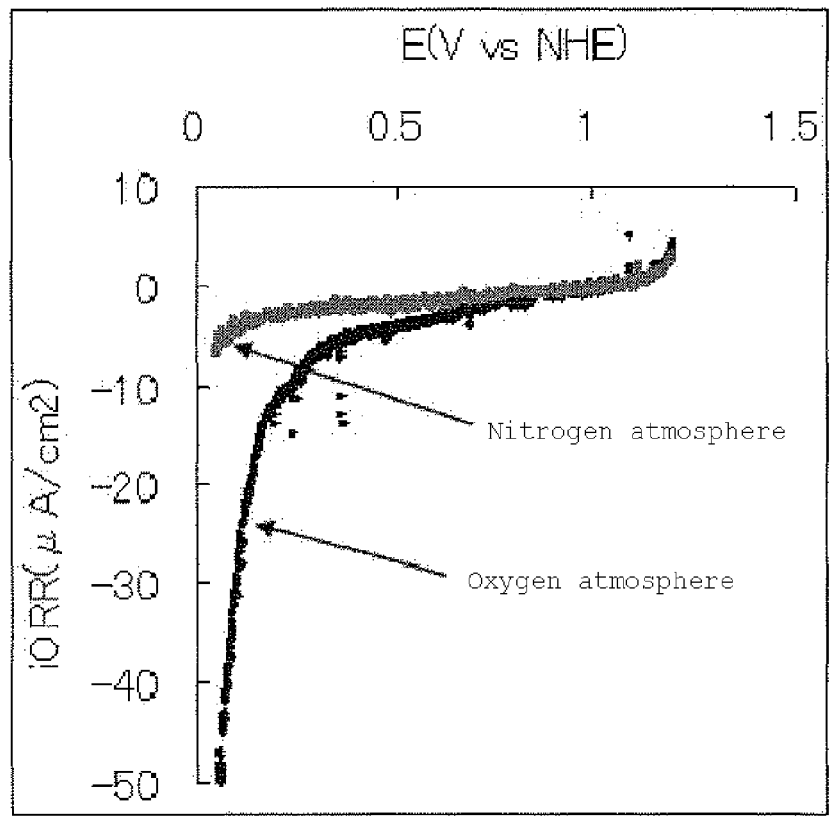
[Fig. 6]
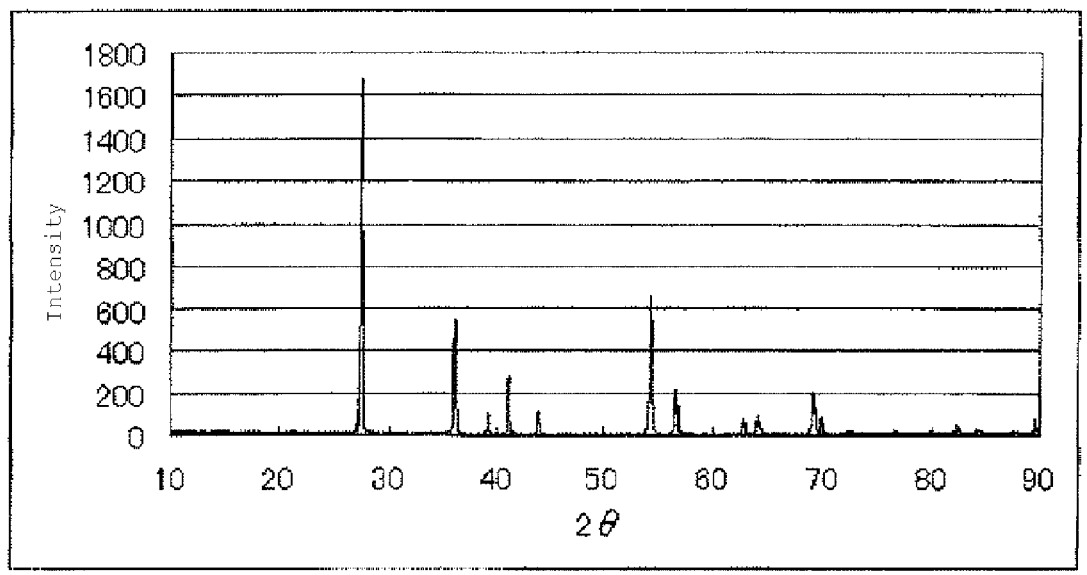

[Fig. 7]
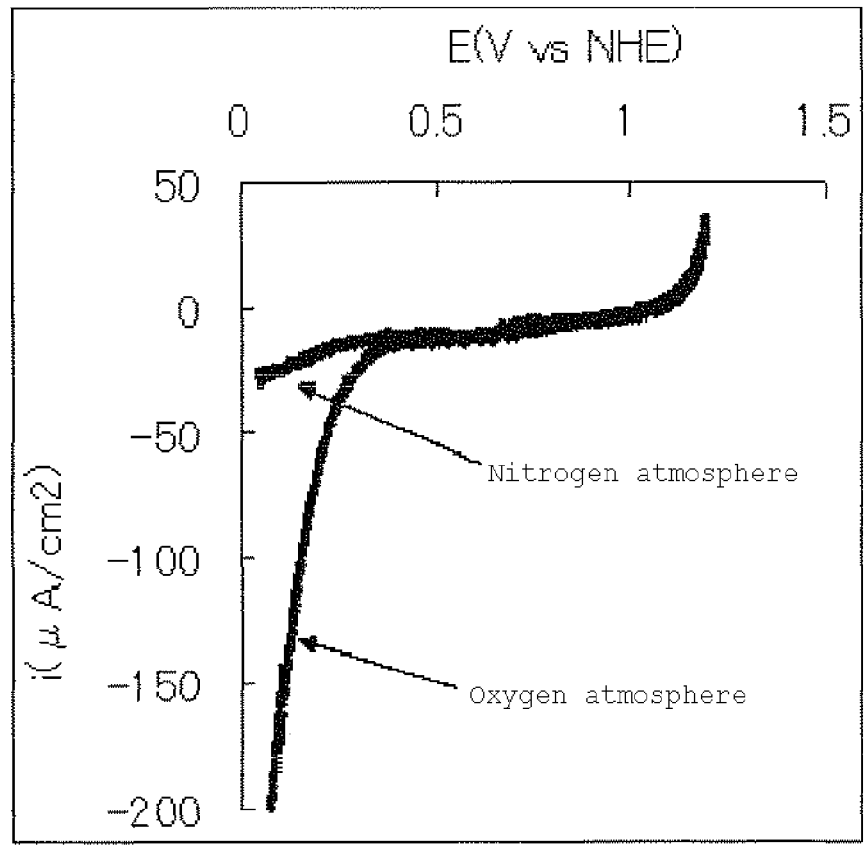
[Fig. 8]
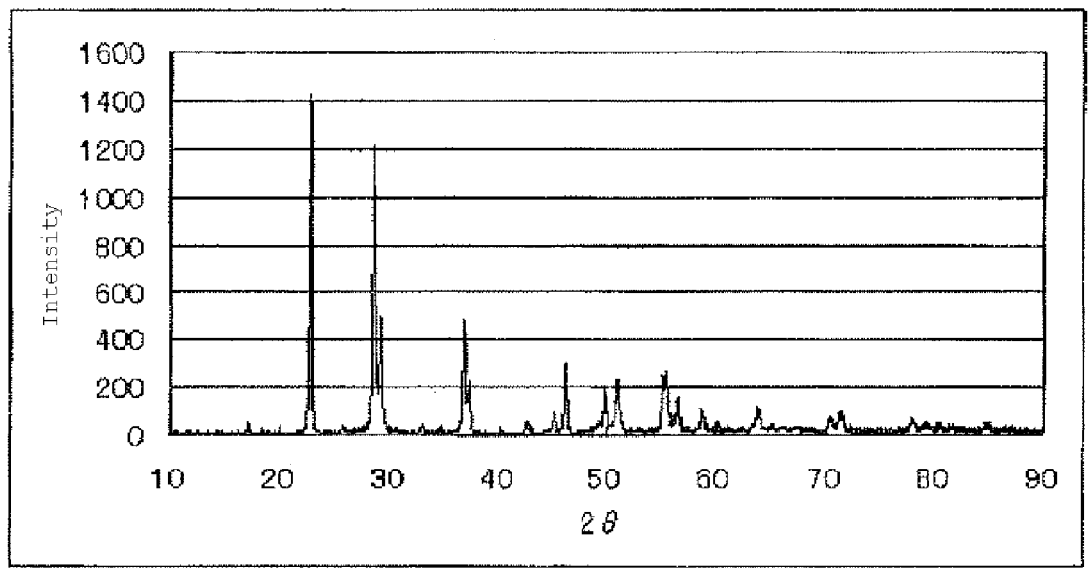

[Fig. 9]
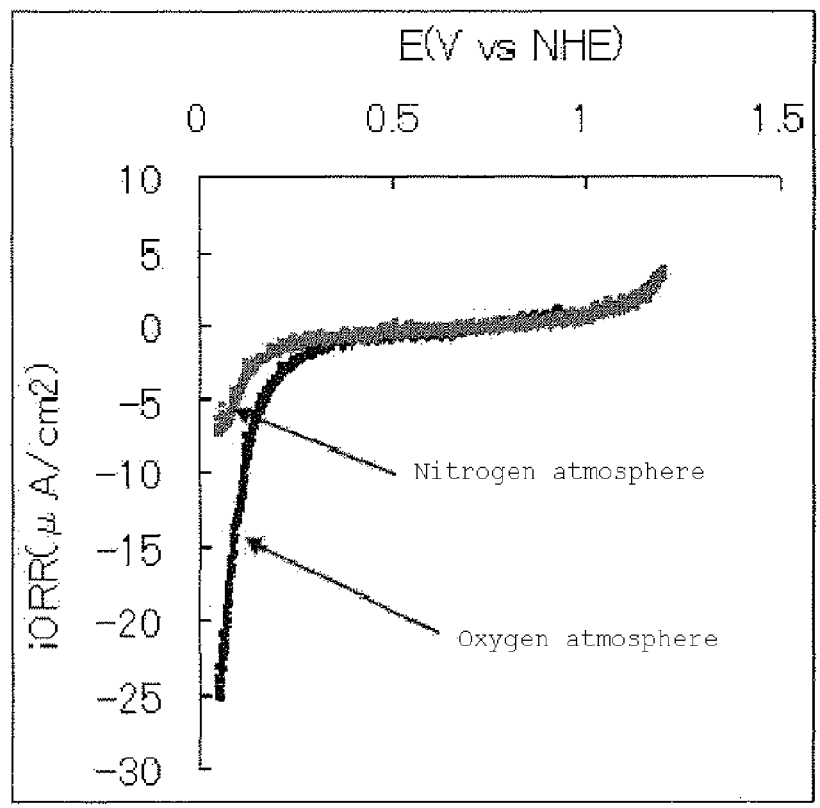
[Fig. 10]
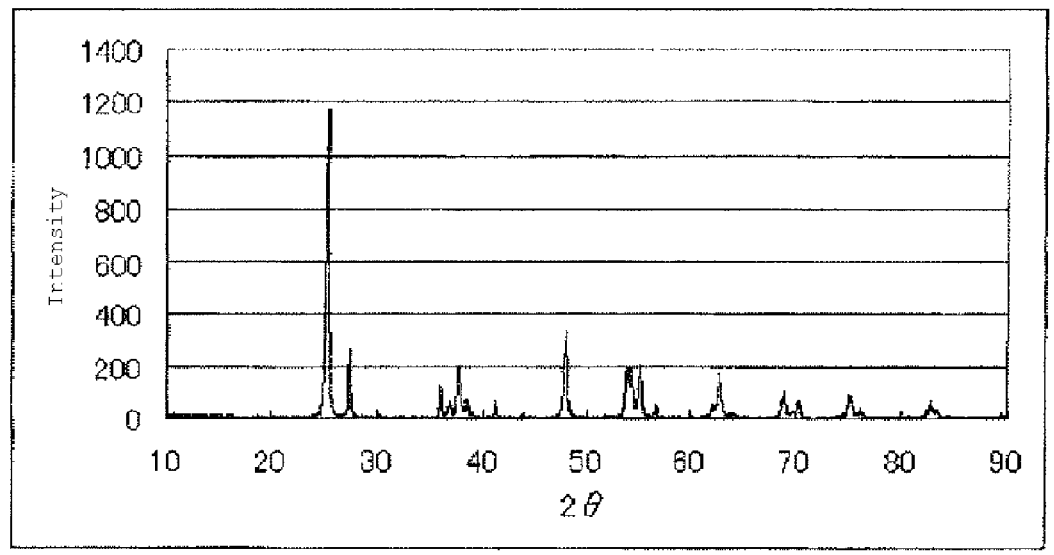

[Fig. 11]
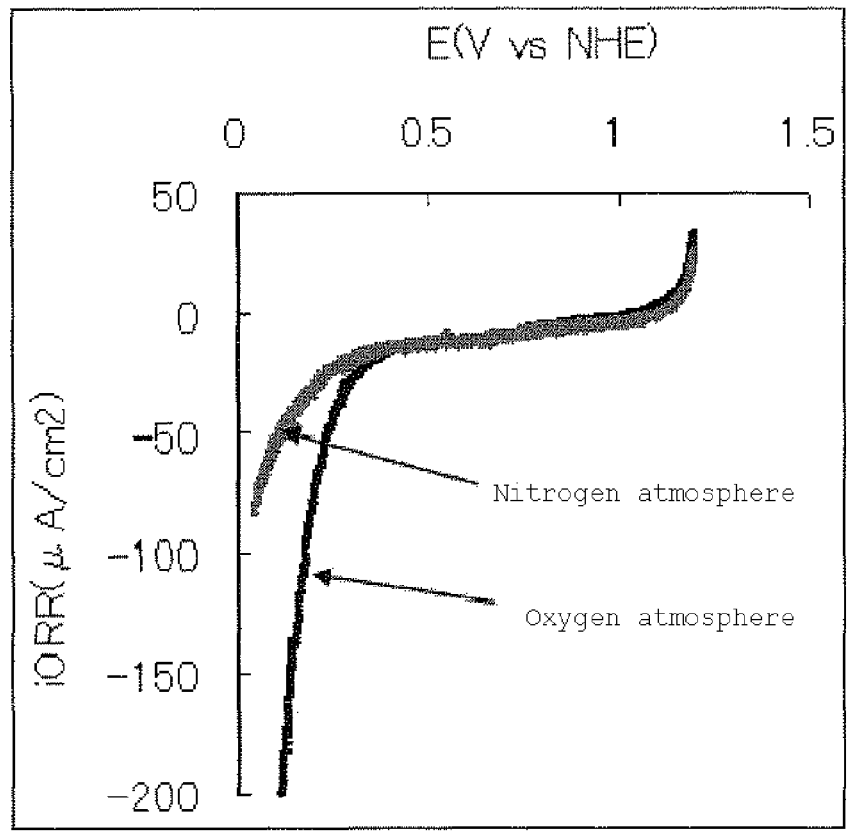
[Fig. 12]
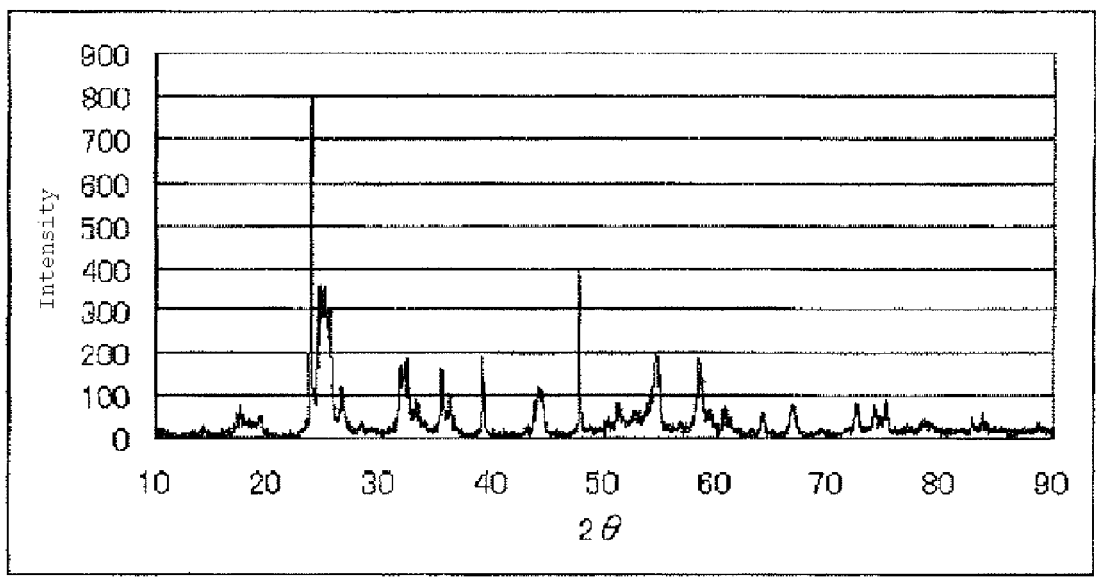

[Fig. 13]
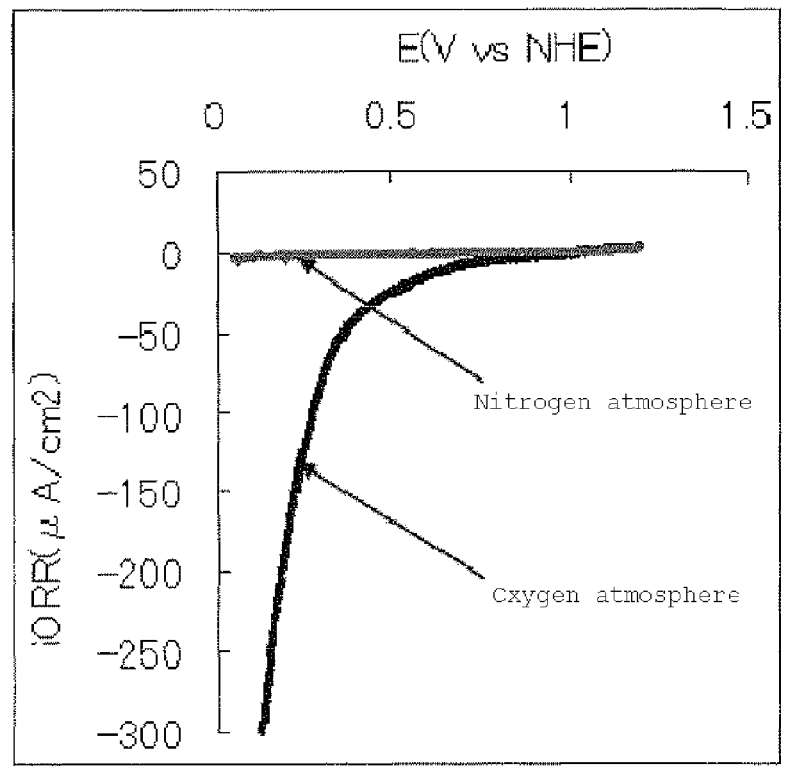
[Fig. 14]
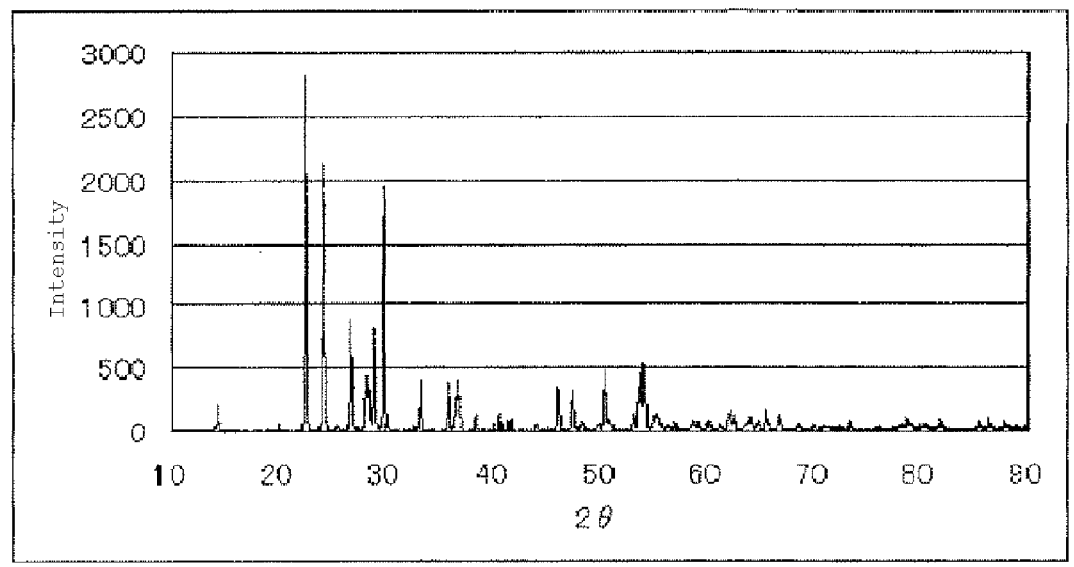

[Fig. 15]
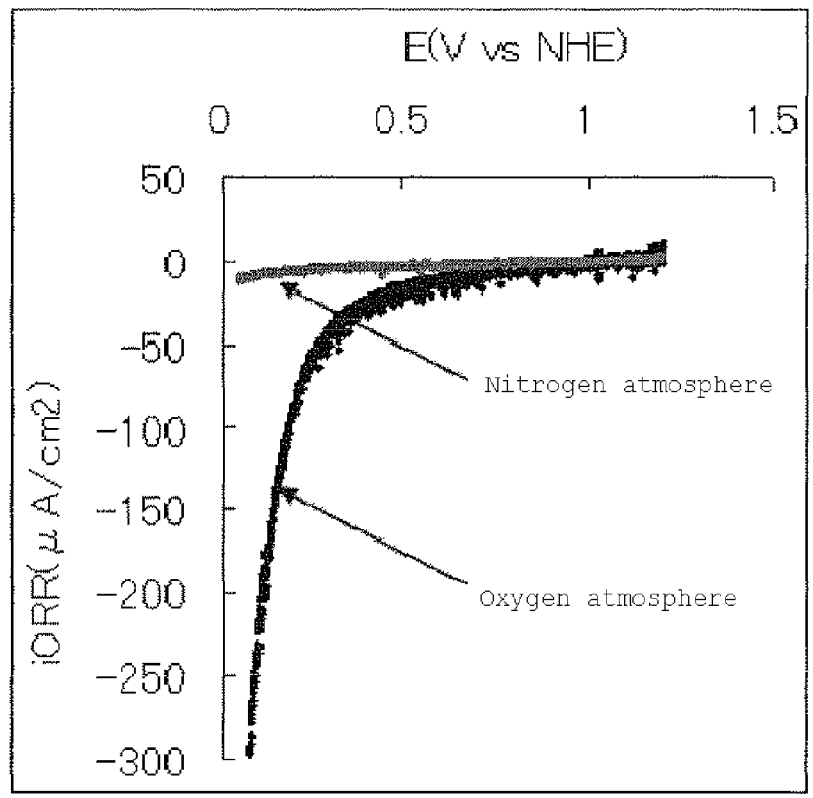
[Fig. 16]
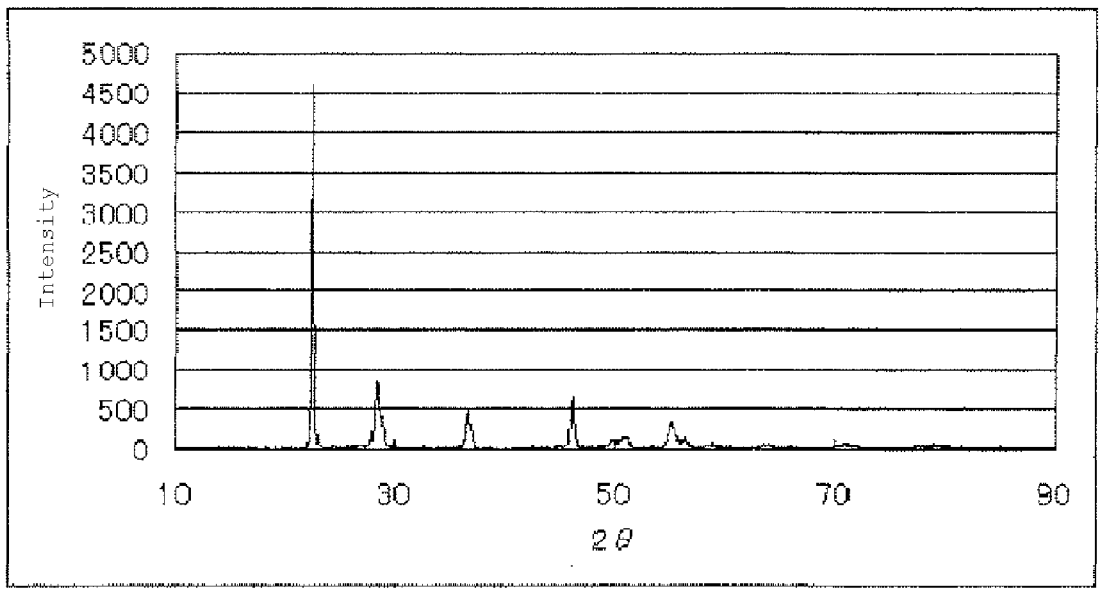

[Fig. 17]
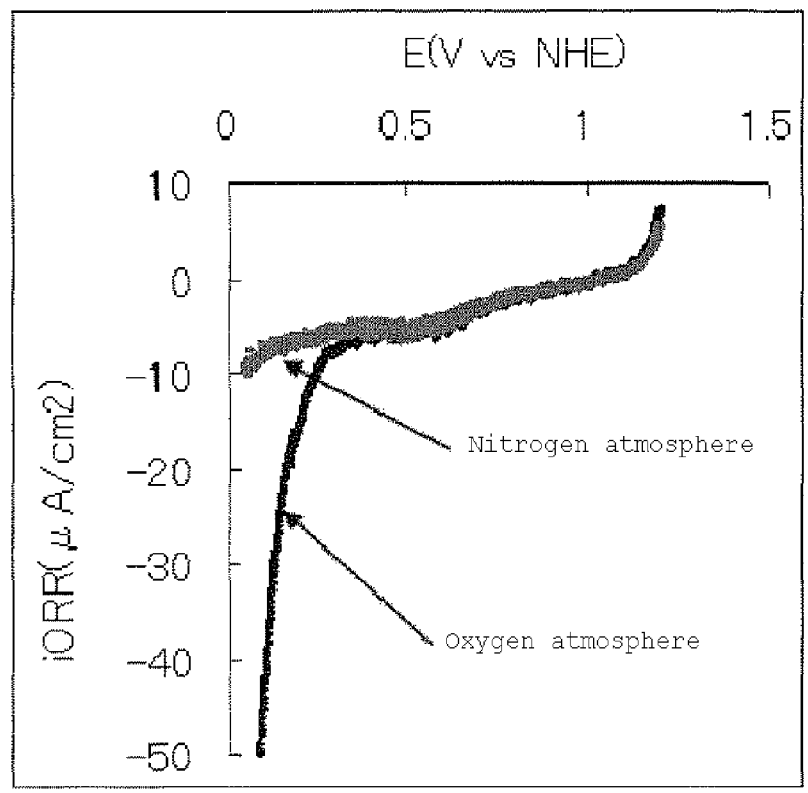
[Fig. 18]
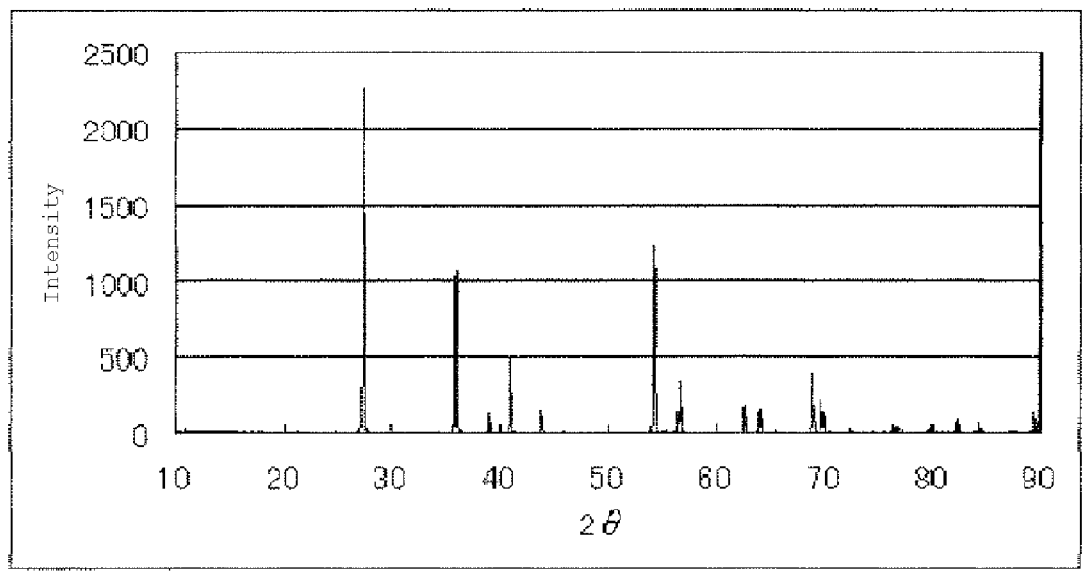

[Fig. 19]
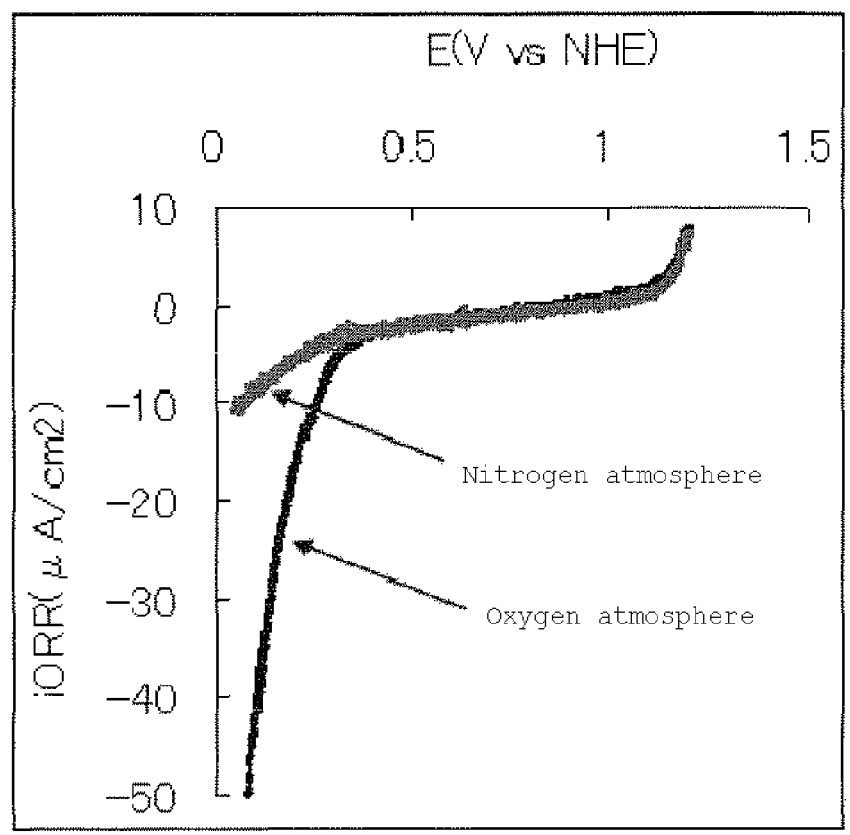
[Fig. 20]
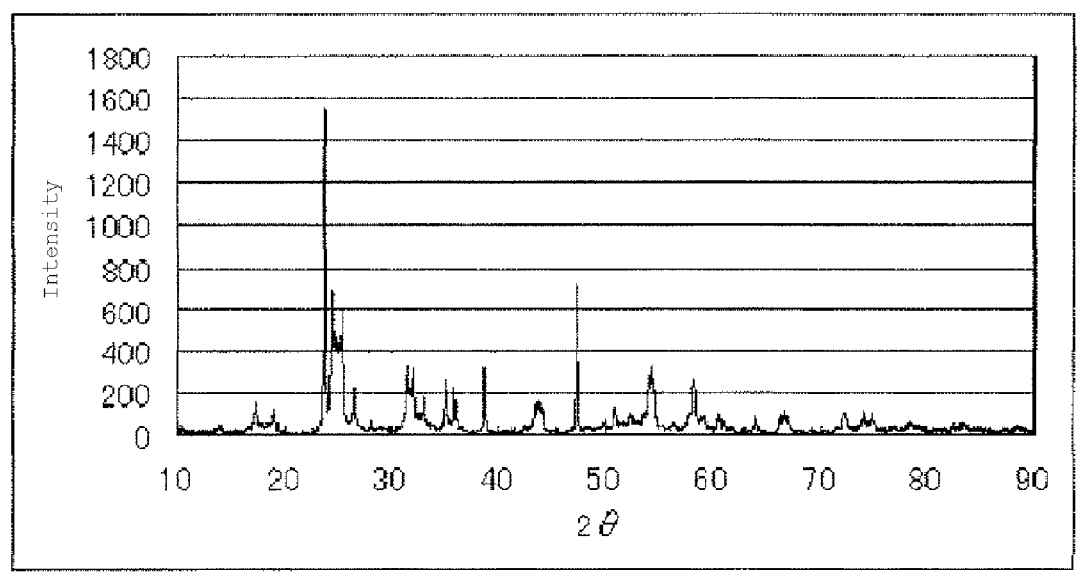

[Fig. 21]
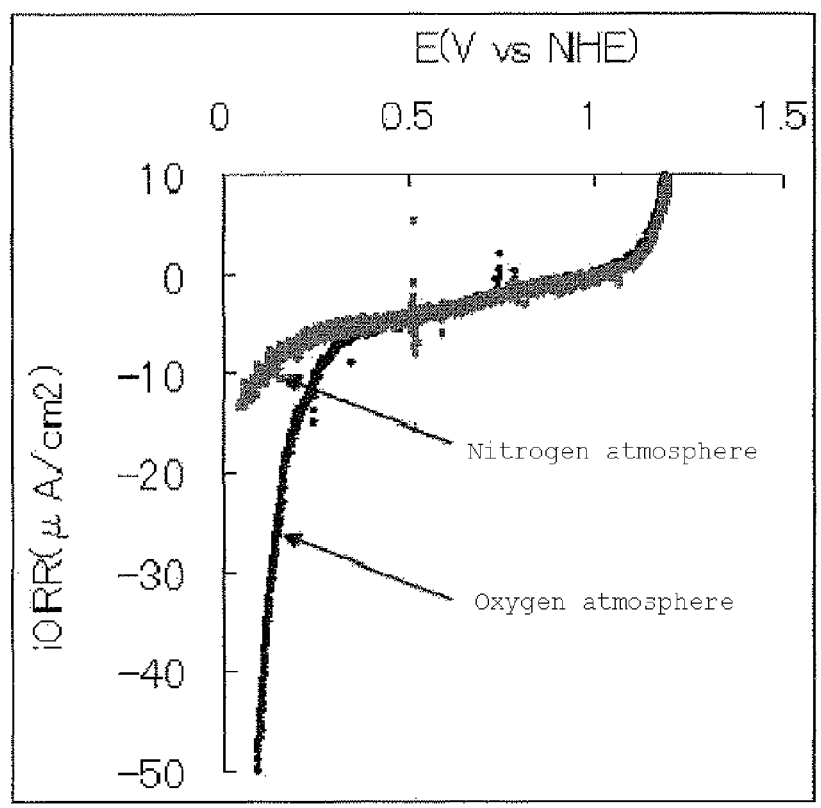
[Fig. 22]
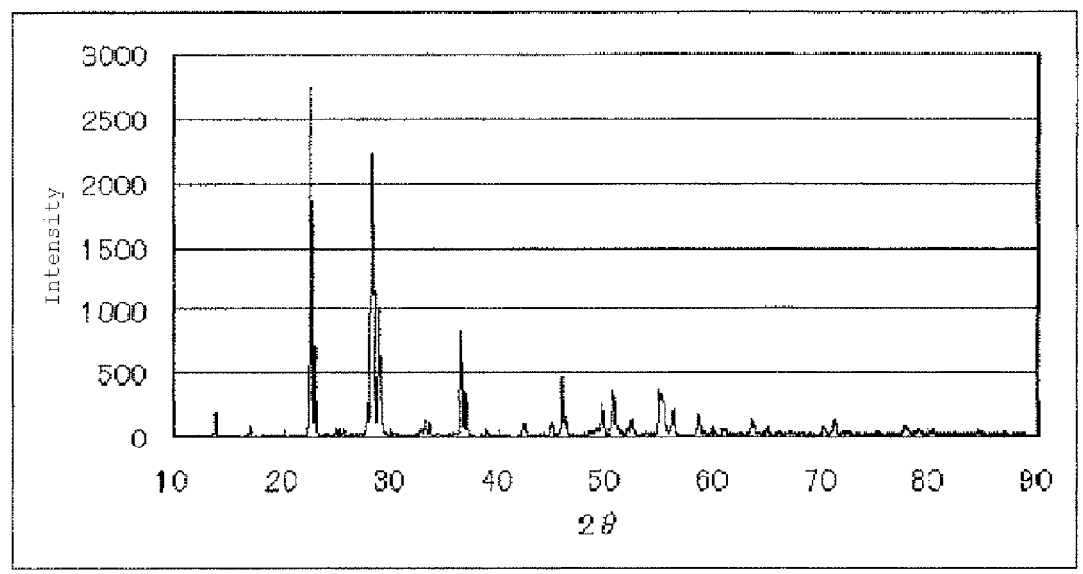

[Fig. 23]
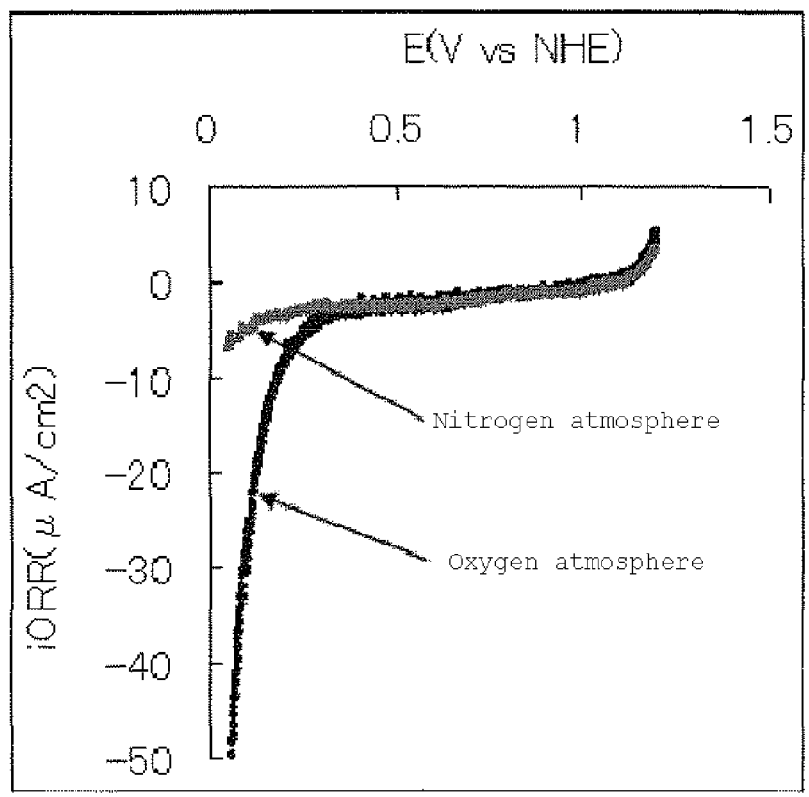
[Fig. 24]
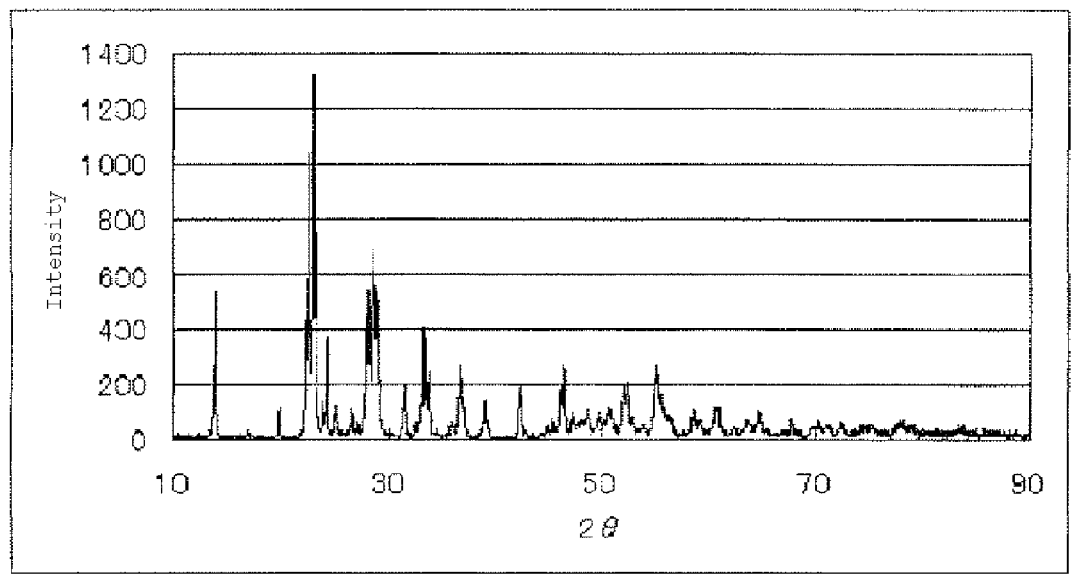

[Fig. 25]
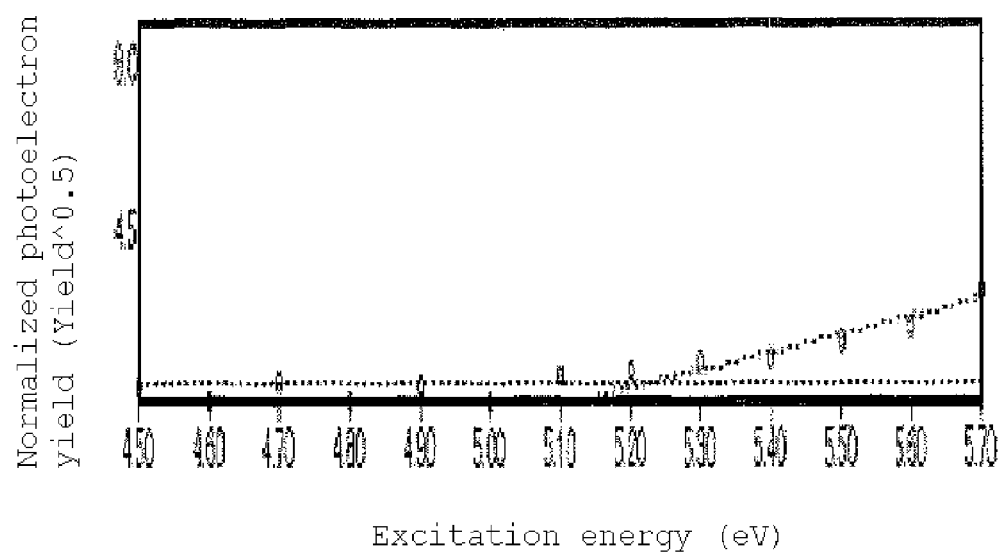

METAL OXIDE ELECTROCATALYST, USE THEREOF, AND PROCESS FOR PRODUCING METAL OXIDE ELECTROCATALYSTS

FIELD OF THE INVENTION

The present invention relates to metal oxide electrocatalysts, uses thereof, and processes for producing metal oxide electrocatalysts.

BACKGROUND OF THE INVENTION

In fuel cells, a layer containing a catalyst for electrode (hereinafter, also the electrocatalyst) is usually provided on the surface of a cathode (air electrode) or an anode (fuel electrode). (Such layers are also referred to as the electrocatalyst layers hereinafter.)

Typical electrocatalysts are platinum catalysts that are stable at high potential and have high catalytic performance. However, since platinum is expensive and exists in a limited amount, alternative catalysts have been desired.

Metal oxide electrocatalysts attract attention as cathode catalysts alternative to the platinum catalysts. Metal oxides are generally stable and are not corroded in acidic electrolytes or at high potential. Further, metal oxide catalyst layers formed on the surface of electrodes stabilize the structure of the electrodes.

For example, Patent Document 1 (JP-A-2004-95263) discloses fuel cell electrocatalysts containing a metal oxide such as $WO_3$, $TiO_2$, $ZrO_2$, PtO, $Sb_2O_4$ or $Sb_2O_3$. However, the fuel cell catalysts also involve platinum and still have the problems as described above.

Patent Document 2 (JP-A-2005-63677) discloses fuel cells that have an electrocatalyst selected from ruthenium oxide, titanium oxide, vanadium oxide, manganese oxide, cobalt oxide, nickel oxide and tungsten oxide. However, these metal oxides as electrocatalysts show low oxygen reduction activity.

Patent Document 1: JP-A-2004-95263
Patent Document 2: JP-A-2005-63677

DISCLOSURE OF THE INVENTION

The present invention is aimed at solving the problems in the background art as described above. It is therefore an object of the invention to provide metal oxide electrocatalysts having high oxygen reduction activity, uses thereof, and processes for producing metal oxide electrocatalysts.

The present inventors studied diligently to solve the problems in the art as above. They have then found that electrocatalysts that are formed of metal oxides obtained by a specific method show high oxygen reduction activity. The present invention has been completed based on the finding.

The present invention is concerned with the following (1) to (20).

(1) A metal oxide electrocatalyst that comprises a metal oxide (Y) obtained by heat treating a metal compound (X) under an oxygen-containing atmosphere,
the valence of a metal in the metal compound (X) being smaller than the valence of the metal in the metal oxide (Y).

(2) The metal oxide electrocatalyst described in (1) above, wherein the metal element forming the metal oxide (Y) is one selected from the group consisting of niobium, titanium, tantalum and zirconium.

(3) The metal oxide electrocatalyst described in (1) above, wherein the metal element forming the metal oxide (Y) is niobium or titanium.

(4) The metal oxide electrocatalyst described in any one of (1) to (3) above, wherein the metal compound (X) is a metal oxide.

(5) The metal oxide electrocatalyst described in any one of (1) to (4) above, wherein the metal compound (X) is niobium dioxide ($NbO_2$) and the metal oxide (Y) is niobium pentoxide ($Nb_2O_5$).

(6) The metal oxide electrocatalyst described in any one of (1) to (5) above, wherein the metal oxide (Y) is orthorhombic, monoclinic or cubic niobium pentoxide ($Nb_2O_5$).

(7) The metal oxide electrocatalyst described in any one of (1) to (4) above, wherein the metal compound (X) is dititanium trioxide ($Ti_2O_3$) and the metal oxide (Y) is titanium oxide ($TiO_2$).

(8) The metal oxide electrocatalyst described in any one of (1), (2), (3), (4) and (7) above, wherein the metal oxide (Y) is rutile titanium oxide ($TiO_2$).

(9) The metal oxide electrocatalyst described in any one of (1) to (8) above, wherein the metal oxide electrocatalyst is powder.

(10) The metal oxide electrocatalyst described in any one of (1) to (9) above, wherein the metal oxide electrocatalyst has a BET specific surface area in the range of 0.1 to 100 $m^2/g$.

(11) The metal oxide electrocatalyst described in any one of (1) to (10) above, wherein the BET specific surface area of the metal oxide electrocatalyst is larger than the BET specific surface area of powder of the metal compound (X).

(12) The metal oxide electrocatalyst described in any one of (1) to (11) above, wherein the metal oxide electrocatalyst has an ionization potential in the range of 4.9 to 5.5 eV.

(13) A catalyst layer comprising the metal oxide electrocatalyst described in any one of (1) to (12) above.

(14) The catalyst layer described in (13) above, which further comprises electron conductive particles.

(15) A membrane electrode assembly comprising a cathode, an anode and an electrolyte membrane arranged between the cathode and the anode, wherein the cathode has the catalyst layer described in (13) or (14) above.

(16) A fuel cell comprising the membrane electrode assembly described in (15) above.

(17) The fuel cell described in (16) above, which is a polymer electrolyte fuel cell.

(18) A process for producing the metal oxide electrocatalysts as described in any one of (1) to (12) above, which comprises a step of heat treating a metal compound (X) in an oxygen-containing atmosphere to obtain a metal oxide (Y).

(19) The process described in (18) above, wherein the temperature in the heat treatment is in the range of 400 to 1200° C.

(20) The process described in (18) or (19) above, which further comprises a step of crushing the metal oxide (Y).

Advantageous Effects of the Invention

The metal oxide electrocatalysts according to the invention show high oxygen reduction activity and are stable and resistant to corrosion in acidic electrolytes at high potential.

BRIEF DESCRIPTION OF THE DRAWINGS

FIG. 1 is a graph showing an evaluation of the oxygen reduction activity of a fuel cell electrode (1) in Example 1.

FIG. 2 is an XRD spectrum of an electrocatalyst (1) of Example 1.

FIG. 3 is a graph showing an evaluation of the oxygen reduction activity of a fuel cell electrode (2) in Example 2.

FIG. 4 is an XRD spectrum of an electrocatalyst (2) of Example 2.

FIG. 5 is a graph showing an evaluation of the oxygen reduction activity of a fuel cell electrode (3) in Example 3.

FIG. 6 is an XRD spectrum of an electrocatalyst (3) of Example 3.

FIG. 7 is a graph showing an evaluation of the oxygen reduction activity of a fuel cell electrode in Comparative Example 1.

FIG. 8 is an XRD spectrum of an electrocatalyst of Comparative Example 1.

FIG. 9 is a graph showing an evaluation of the oxygen reduction activity of a fuel cell electrode in Comparative Example 2.

FIG. 10 is an XRD spectrum of an electrocatalyst of Comparative Example 2.

FIG. 11 is a graph showing an evaluation of the oxygen reduction activity of a fuel cell electrode in Comparative Example 3.

FIG. 12 is an XRD spectrum of an electrocatalyst of Comparative Example 3.

FIG. 13 is a graph showing an evaluation of the oxygen reduction activity of a fuel cell electrode (4) in Example 4.

FIG. 14 is an XRD spectrum of an electrocatalyst (4) of Example 4.

FIG. 15 is a graph showing an evaluation of the oxygen reduction activity of a fuel cell electrode (5) in Example 5.

FIG. 16 is an XRD spectrum of an electrocatalyst (5) of Example 5.

FIG. 17 is a graph showing an evaluation of the oxygen reduction activity of a fuel cell electrode in Comparative Example 4.

FIG. 18 is an XRD spectrum of an electrocatalyst of Comparative Example 4.

FIG. 19 is a graph showing an evaluation of the oxygen reduction activity of a fuel cell electrode in Comparative Example 5.

FIG. 20 is an XRD spectrum of an electrocatalyst of Comparative Example 5.

FIG. 21 is a graph showing an evaluation of the oxygen reduction activity of a fuel cell electrode in Comparative Example 6.

FIG. 22 is an XRD spectrum of an electrocatalyst of Comparative Example 6.

FIG. 23 is a graph showing an evaluation of the oxygen reduction activity of a fuel cell electrode in Comparative Example 7.

FIG. 24 is an XRD spectrum of an electrocatalyst of Comparative Example 7.

FIG. 25 is a graph showing the ionization potential of the electrocatalyst (1) of Example 1.

PREFERRED EMBODIMENTS FOR CARRYING OUT THE INVENTION

Metal Oxide Electrocatalysts

The metal oxide electrocatalysts of the invention comprise a metal oxide (Y) obtained by heat treating a metal compound (X) under an oxygen-containing atmosphere, and the valence of a metal in the metal compound (X) is smaller than the valence of the metal in the metal oxide (Y).

The metal element forming the metal oxide (Y) is preferably a transition metal that easily shows a catalytic performance. Of the transition metals, Group IVa and Group Va transition metals that are electrochemically stable in acidic solutions are preferable, and a transition metal element selected from the group consisting of niobium, titanium, tantalum and zirconium is more preferable. In particular, niobium and titanium are preferable because of high availability.

The metal compound (X) is formed of one metal element and one or more elements other than the metal elements. Examples of the metal compounds (X) include metal oxides, metal salts such as carboxylates, and metal complexes such as acetylacetone complexes. Metal oxides are preferable in view of low costs and easiness in the heat treatment with wide ranges of oxygen concentration and heat treatment temperature. Specific examples include niobium monoxide (NbO), niobium dioxide ($NbO_2$), triniobium pentoxide ($Nb_3O_5$), titanium trioxide ($Ti_2O_3$) and titanium monoxide (TiO), with niobium dioxide ($NbO_2$) and titanium trioxide ($Ti_2O_3$) being preferable.

Exemplary metal oxides (Y) are niobium pentoxide ($Nb_2O_5$) obtained by heat treating niobium dioxide ($NbO_2$) as the metal compound (X) under an oxygen-containing atmosphere, and titanium dioxide ($TiO_2$) obtained by heat treating dititanium trioxide ($Ti_2O_3$) as the metal compound (X) under an oxygen-containing atmosphere.

The metal compound (X) is usually powder. Heat treating the powder of the metal compound (X) under an oxygen-containing atmosphere gives a powdery metal oxide (Y).

The niobium pentoxide ($Nb_2O_5$) is preferably an orthorhombic, monoclinic or cubic crystal because it has highly active crystal faces. The titanium dioxide ($TiO_2$) is preferably a rutile type because it has highly active crystal faces.

Although the reasons as to why the metal oxide electrocatalysts show high oxygen reduction activity are unclear, the present inventors assume one of the reasons as follows.

For a metal oxide electrocatalyst to show high oxygen reduction activity, it is considered necessary that the catalyst has appropriate oxygen defects on the surface. However, metal oxides generally produced, for example reagent-based metal oxides, probably do not possess appropriate defects on the surface for increasing the oxygen reduction activity. On the other hand, the metal oxide electrocatalysts of the invention that are formed of the metal oxides (Y) obtained by the specific process are considered to have appropriate defects on the surface to achieve increased oxygen reduction activity.

In the specific process, the metal compound (X) is heat treated under an oxygen-containing atmosphere into the metal oxide (Y), and the metal of the metal oxide (Y) has a valence larger than the valence of the metal in the metal compound (X).

The present inventors assume that the metal oxide (Y) obtained by the process involving the change in metal valence has appropriate defects on the surface and the metal oxide electrocatalysts comprising the metal oxides (Y) show high oxygen reduction activity.

(Heat Treatment)

The metal oxides (Y) are obtained by heat treating the metal compounds (X) under an oxygen-containing atmosphere. As a result of the heat treatment, the metal of the metal oxide (Y) increases the valence compared to the valence of the metal in the metal compound (X).

Heat treating the metal compound (X) under an oxygen-containing atmosphere breaks the bond between the metal atom and other atom(s) in the metal compound (X), and the metal atom forms a new bond with the oxygen atom. The metal atom often fails to form a bond with the oxygen atom, and the resultant metal oxide (Y) from the heat treatment consequently has oxygen defects. The present inventors assume that the metal oxide electrocatalysts formed of the metal oxide (Y) show high oxygen reduction activity because of the action of such oxygen defects.

When compounds formed of one metal element and one or more elements other than the metal elements are treated by conventional processes into metal oxides, the valence of the metal element does not change between the metal oxide and the starting metal compound.

For example, niobium pentoxide may be produced by strongly heating niobic acid or a white product obtained by treating a niobate solution with sulfuric acid; alternatively, niobium may be strongly heated into niobium pentoxide (Kagaku Daijiten (Chemical Dictionary) Vol. 3, edited by Kagaku Daijiten Editorial Committee, compact edition, 30th impression, KYORITSU SHUPPAN CO., LTD., Feb. 15, 1987, p. 929).

In another example, titanium dioxide may be produced by precipitating and separating titanium hydroxide from an aqueous titanium (IV) salt solution and strongly heating the hydroxide into titanium dioxide. Alternatively, a titanium (IV) halide may be passed through a red-hot tube with vapor and carbon dioxide to give titanium dioxide of brookite type (Kagaku Daijiten (Chemical Dictionary) Vol. 3, edited by Kagaku Daijiten Editorial Committee, compact edition, 30th impression, KYORITSU SHUPPAN CO., LTD., Feb. 15, 1987, p. 921).

However, the metal oxides produced by these conventional methods do not show high oxygen reduction activity when used as electrocatalysts.

The heat treatment is preferably performed with use of a calcination apparatus.

The calcination apparatus is preferably an electric furnace because the temperature in the furnace may be controlled precisely.

The heat treatment may be performed in an oxidizing atmosphere such that the metal compound (X) is converted into the metal oxide (Y). The heat treatment temperature, the heat treatment time and the oxygen concentration may vary depending on the kinds of the metal compounds (X) and the metal oxides (Y).

The oxygen amount required in the heat treatment may vary depending on the kinds of the metal compounds (X) or the metal oxides (Y). When the metal compound (X) is a metal oxide, the heat treatment requires less oxygen than needed when the metal compound (X) is other than metal oxides. This is because when the metal compound (X) is for example a metal complex, the ligand should be replaced by oxygen in the course of producing the metal oxide (Y).

The oxygen concentration in the heat treatment is not particularly limited as long as the necessary oxygen amount as described above is ensured. The heat treatment may be usually performed in air.

The reaction rate may be controlled by regulating the atmosphere in the furnace. For example, the reaction rate may be controlled by performing the calcination while passing an inert gas such as nitrogen or argon through the furnace and regulating the atmosphere in the furnace. In the case of a vacuum furnace, the pressure is reduced to the necessary oxygen amount and the vacuum level is maintained during the calcination.

The heat treatment temperature and the heat treatment time may vary depending on the amount of energy required for the metal compound (X) to react with oxygen into the metal oxide (Y). If the heat treatment temperature is low and the heat treatment time is short, the required amount of energy cannot be reached and the metal oxide (Y) cannot be obtained. If the heat treatment temperature is high and the heat treatment time is excessively long, the metal oxide (Y) is grown to larger grains and the obtainable metal oxide electrocatalyst formed of the metal oxide (Y) tends to have a smaller BET specific surface area.

In view of these disadvantages, the maximum temperature reached during the heat treatment is preferably in the range of 400 to 1200° C. The heat treatment time may be determined appropriately depending on the kinds of the metal compounds (X) and the metal oxides (Y), the heat treatment temperature or the oxygen concentration. The heat treatment time is usually in the range of 10 minutes to 5 hours. The heat treatment time includes the temperature increasing time and the temperature decreasing time.

The metal oxide electrocatalysts are preferably in the form of powder. Powdery electrocatalysts have an increased area and achieve a higher catalytic performance.

In a preferred embodiment, the metal oxide (Y) obtained by the heat treatment is crushed. By the crushing, the metal oxide electrocatalyst is broken into finer particles and such fine metal oxide electrocatalyst can be favorably dispersed in the catalyst layer.

The methods for crushing the metal oxides (Y) include roll milling, ball milling, medium stirring milling, and crushing with an air flow crusher, a mortar or a crushing tank. To crush the metal oxide (Y) into finer particles, an air flow crusher is preferably used. To facilitate the crushing in small amounts, the use of a mortar is preferable.

The metal oxide electrocatalyst preferably has a BET specific surface area in the range of 0.1 to 100 $m^2/g$, and more preferably 0.2 to 10 $m^2/g$. The specific surface area in this range ensures high catalytic performance.

The BET specific surface area in the invention may be measured with a commercially available BET adsorption apparatus. For example, Micromeritics Gemini 2360 manufactured by Shimadzu Corporation may be used.

As described above, the metal oxide electrocatalyst is preferably powder to achieve a higher catalytic performance.

The particle diameter of the metal oxide electrocatalyst powder may be determined from the BET specific surface area, based on the equation (1) below regarding the particles to be spherical.

$$D = 6/\rho S \qquad (1)$$

D: particle diameter (μm) of metal oxide electrocatalyst powder $\rho$: specific gravity ($g/cm^3$) of metal oxide electrocatalyst powder S: BET specific surface area ($m^2/g$) of metal oxide electrocatalyst powder In a preferred embodiment to achieve a higher catalytic performance, the BET specific surface area of the metal oxide electrocatalyst is larger than the BET specific surface area of the metal compound (X) used as the starting material.

The metal oxide electrocatalyst formed of the metal oxide (Y) shows higher oxygen reduction activity when the BET specific surface area of the metal oxide electrocatalyst formed of the metal oxide (Y) is larger than the BET specific surface area of the metal compound (X). This advantage is probably attributed to the increased catalyst area.

In order that the metal oxide electrocatalyst formed of the metal oxide (Y) has a BET specific surface area larger than the BET specific surface area of the starting metal compound (X), the heat treatment time and the heat treatment temperature may be determined appropriately depending on the kinds of the metal compounds (X) and the metal oxides (Y). For example, the heat treatment of niobium dioxide ($NbO_2$) into niobium pentoxide ($Nb_2O_5$) is preferably performed at 800 to 1000° C. for 10 minutes to 5 hours.

The metal oxide electrocatalyst preferably has an ionization potential in the range of 4.9 to 5.5 eV, more preferably 5.0 to 5.4 eV, and still more preferably 5.1 to 5.3 eV. This ionization potential ensures that the metal oxide electrocatalyst shows high oxygen reduction activity. Although the details are unclear, the present inventors assume that the metal oxide electrocatalyst having the above ionization potential achieves high oxygen reduction activity because the metal oxide forming the electrocatalyst has an electronic state suited for oxygen reduction.

In the invention, the ionization potential is measured by a method as will be described in the working examples later.

The metal oxide electrocatalyst preferably has an oxygen reduction onset potential of not less than 0.4 V as measured versus a reversible hydrogen electrode (vs. NHE) by the measurement method (A) described below.

[Measurement Method (A)]

The electrocatalyst dispersed in electron conductive carbon particles is added to a solvent such that the electrocatalyst and the carbon particles account for 1 wt % relative to the solvent. The mixture is ultrasonically stirred to give a suspension. The carbon herein is carbon black (specific surface area: 100-300 $m^2/g$) (e.g., XC-72 manufactured by Cabot Corporation), and the electrocatalyst is dispersed therein with an electrocatalyst:carbon weight ratio of 95:5. The solvent is a mixture of isopropyl alcohol:water (=2:1 by weight).

While ultrasonicating the suspension, a 30 μL portion thereof is collected and is quickly dropped on a glassy carbon electrode (diameter: 5.2 mm).

After the dropping, the suspension is dried at 120° C. for 1 hour to form a layer containing the electrocatalyst on the glassy carbon electrode.

Subsequently, 10 μL of Nafion (a 5% Nafion solution (DE521) manufactured by Du Pont Kabushiki Kaisha) diluted ten times with pure water is dropped thereon and dried at 120° C. for 1 hour.

The electrode manufactured above is polarized in a 0.5 mol/dm$^3$ sulfuric acid solution at 30° C. under an oxygen atmosphere or a nitrogen atmosphere at a potential scanning rate of 5 mV/sec, thereby recording a current-potential curve. As a reference, a reversible hydrogen electrode is polarized in a sulfuric acid solution of the same concentration. In the current-potential curve, the potential at which the reduction current starts to differ by 0.2 μA/cm$^2$ or more between the polarization under the oxygen atmosphere and that under the nitrogen atmosphere is defined as the oxygen reduction onset potential.

If the oxygen reduction onset potential is less than 0.7 V (vs. NHE), the use of the metal oxide electrocatalyst in a fuel cell cathode may cause the generation of hydrogen peroxide. For the oxygen reduction, the oxygen reduction onset potential is preferably 0.85 V (vs. NHE) or more. A higher oxygen reduction onset potential is more preferable. The upper limit thereof is not particularly limited but is theoretically 1.23 V (vs. NHE).

As described above, the oxygen reduction onset potential may be increased by controlling the heat treatment time and the heat treatment temperature in the preferred ranges.

The electrode formed of the metal oxide electrocatalyst is preferably used at a potential of not less than 0.4 V relative to a reversible hydrogen electrode potential (vs. NHE) in an acidic electrolyte. The upper limit of the potential depends on the stability of the electrode. The electrode according to the invention may be used at as high a potential as about 1.23 V (vs. NHE) which is the oxygen generation potential.

At a potential of less than 0.4 V (vs. NHE), the metal oxide can exist stably but oxygen cannot be reduced sufficiently. Catalysts having such a low potential are not useful as fuel cell electrodes.

Processes for Producing Metal Oxide Electrocatalysts

The process for producing metal oxide electrocatalysts according to the invention produces the metal oxide electrocatalysts as described hereinabove. The process includes a step of heat treating a metal compound (X) in an oxygen-containing atmosphere to obtain a metal oxide (Y).

The heat treatment temperature is preferably in the range of 400 to 1200° C.

In a preferred embodiment, the process for producing metal oxide electrocatalysts may further include a step of crushing the metal oxide (Y).

The details concerning the metal compounds (X), the metal oxides (Y), the heat treatment conditions and the like are as already described hereinabove.

Catalyst Layers

The catalyst layer of the invention contains the metal oxide electrocatalyst. Preferably, the catalyst layer further contains electron conductive particles. When the catalyst layer containing the metal oxide electrocatalyst further contains electron conductive particles, the reduction current may be increased because the electron conductive particles establish electrical contacts with the metal oxide electrocatalyst to induce electrochemical reaction.

The electron conductive particles are generally used as a carrier for the metal oxide electrocatalyst.

Examples of the electron conductive particles include carbons, conductive polymers, conductive ceramics, metals and conductive inorganic oxides such as tungsten oxide and iridium oxide. These electron conductive particles may be used singly or in combination with one another. In particular, carbon or a mixture of carbon and other electron conductive particles is preferable because carbon has a large specific surface area. When the catalyst layer contains the metal oxide electrocatalyst and carbon, the reduction current may be further increased.

Examples of the carbons include carbon blacks, graphites, black leads, activated carbons, carbon nanotubes, carbon nanofibers, carbon nanohorns and fullerenes. If the particle diameter of carbon is excessively small, the carbon may not be able to form an electron conductive path. If the particle diameter is excessively large, the catalyst layer tends to reduce gas diffusion properties or the catalyst usage rate tends to be lowered. The carbon particle diameter is preferably in the range of 10 to 1000 nm, and more preferably 10 to 100 nm.

The conductive polymers are not particularly limited. Examples thereof include polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline and polyphenylquinoxaline. Of these, polypyrrole, polyaniline and polythiophene are preferred, and polypyrrole is more preferred.

When the carbon is used as the electron conductive particles, the weight ratio of the metal oxide electrocatalyst and the carbon (metal oxide electrocatalyst:electron conductive particles) is preferably in the range of 80:20 to 1000:1.

In a usual embodiment, the catalyst layer further contains an electrolyte such as a polymer electrolyte or the conductive polymer described above.

The polymer electrolytes may be any polymer electrolytes generally used in catalyst layers without limitation. Specific examples include perfluorocarbon polymers having a sulfonic acid group (such as Nafion (a 5% Nafion solution (DE521) manufactured by Du Pont Kabushiki Kaisha), hydrocarbon polymer compounds having a sulfonic acid group, polymer compounds doped with inorganic acids such as phosphoric acid, organic/inorganic hybrid polymers partially substituted with proton conductive functional groups, and proton conductors composed of a polymer matrix impregnated with a phosphoric acid solution or a sulfuric acid solution. Of these, Nafion (a 5% Nafion solution (DE521) manufactured by Du Pont Kabushiki Kaisha) is preferable.

The conductive polymers are not particularly limited. Examples thereof include polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline and polyphenylquinoxaline. Of these, polypyrrole, polyaniline and polythiophene are preferred, and polypyrrole is more preferred.

The catalyst layers according to the present invention contain the electrocatalyst that has high oxygen reduction activity and is resistant to corrosion in acidic electrolytes at high potential. Accordingly, the catalyst layers of the invention are suited for use in fuel cell cathodes (as cathode catalyst layers). In particular, the catalyst layers are suitably provided in cathodes of membrane electrode assemblies in polymer electrolyte fuel cells.

The metal oxide electrocatalyst may be dispersed on the electron conductive particles as carriers by methods such as airborne dispersion methods and in-liquid dispersion methods. The in-liquid dispersion methods are preferable because the catalyst layer may be simply prepared from a dispersion of the metal oxide electrocatalyst and the electron conductive particles in a solvent. Exemplary in-liquid dispersion methods include an orifice-choked flow method, a rotational shear flow method and an ultrasonic method. The solvents used in the in-liquid dispersion methods are not particularly limited as long as the metal oxide electrocatalysts or the electron conductive particles are not corroded and are dispersed therein. Volatile liquid organic solvents and water are generally used.

When the metal oxide electrocatalyst is dispersed on the electron conductive particles, the electrolyte described above and a dispersant may be dispersed together.

The catalyst layer may be formed by any methods without limitation. For example, a suspension containing the metal oxide electrocatalyst, the electron conductive particles and the electrolyte may be applied to an electrolyte membrane or a gas diffusion layer as described later. The application methods include dipping, screen printing, roll coating and spraying. In another embodiment, a suspension containing the electrocatalyst, the electron conductive particles and the electrolyte may be applied or filtered on a substrate to form a catalyst layer, and the catalyst layer may be transferred to an electrolyte membrane.

Uses

The membrane electrode assemblies of the invention have a cathode, an anode and an electrolyte membrane between the cathode and the anode. The cathode has the catalyst layer as described hereinabove.

The electrolyte membranes may be general perfluorosulfonic acid electrolyte membranes or hydrocarbon electrolyte membranes. Further, polymer fine-pore membranes impregnated with liquid electrolyte, or porous membranes filled with polymer electrolyte may be used.

The cathode is usually composed of the catalyst layer described above and a gas diffusion layer.

The gas diffusion layers are not particularly limited as long as they have electron conductivity, high gas diffusion properties and high corrosion resistance. Carbon-based porous materials such as carbon paper and carbon cloth, and stainless steel and anticorrosive-coated aluminum foils for weight reduction may be generally used.

The fuel cells according to the present invention have the membrane electrode assemblies as described above.

The electrode reaction in fuel cells takes place at a three-phase interface (electrolyte-electrocatalyst-reaction gas). The fuel cells are classified depending on the electrolytes used, into several types such as molten carbonate fuel cells (MCFC), phosphoric acid fuel cells (PAFC), solid oxide fuel cells (SOFC) and polymer electrolyte fuel cells (PEFC). In particular, the membrane electrode assemblies of the invention are suitably used in polymer electrolyte fuel cells.

EXAMPLES

The present invention will be described based on examples hereinbelow without limiting the scope of the invention.

Example 1

Production of Metal Oxide Electrocatalyst

Niobium dioxide ($NbO_2$) powder (purity: 99.9%, manufactured by Kojundo Chemical Lab. Co., Ltd.) in an amount of 5.0 g was placed in an alumina crucible and was heat treated in an electric furnace (desktop muffle furnace KDF P90 manufactured by DENKEN CO., LTD.) under a stream of $N_2$ at 50 NL/min under the following conditions.

Temperature increasing rate: 20° C./min
Calcination temperature: 1000° C.
Calcination time: 2 hours After the heat treatment, the calcined product was naturally cooled. As a result, 5.3 g of niobium oxide was obtained. The niobium oxide was sufficiently crushed in a mortar to give a metal oxide electrocatalyst (1).

(Production of Fuel Cell Electrode)

The oxygen reduction activity was determined in the following manner. The metal oxide electrocatalyst (1) in an amount of 0.095 g and carbon (XC-72 manufactured by Cabot Corporation) weighing 0.005 g were added to 10 g of a solution consisting of isopropyl alcohol:pure water=2:1 (weight ratio). The mixture was ultrasonically stirred to give a suspended mixture. The mixture in an amount of 30 μL was applied on a glassy carbon electrode (diameter: 5.2 mm, manufactured by Tokai Carbon Co., Ltd.) and was dried at 120° C. for 1 hour. Subsequently, 10 μL of Nafion (a 5% Nafion solution (DE521) manufactured by Du Pont Kabushiki Kaisha) diluted ten times with pure water was applied thereon and was dried at 120° C. for 1 hour. A fuel cell electrode (1) was thus manufactured.

(Evaluation of Oxygen Reduction Activity)

The fuel cell electrode (1) manufactured above was evaluated for catalytic performance (oxygen reduction activity) as described below.

The fuel cell electrode (1) was polarized in a 0.5 mol/dm³ sulfuric acid solution at 30° C. under an oxygen atmosphere or a nitrogen atmosphere at a potential scanning rate of 5 mV/sec, thereby recording a current-potential curve. As a reference, a reversible hydrogen electrode was polarized in a sulfuric acid solution of the same concentration.

In the current-potential curve obtained, the potential at which the reduction current started to differ by 0.2 μA/cm² or more between the polarization under the oxygen atmosphere and that under the nitrogen atmosphere was defined as the oxygen reduction onset potential. The difference between the reduction currents was defined as the oxygen reduction current.

The catalytic performance (oxygen reduction activity) of the fuel cell electrode (1) was evaluated based on the oxygen reduction onset potential and the oxygen reduction current.

In detail, the higher the oxygen reduction onset potential and the higher the oxygen reduction current, the higher the catalytic performance (oxygen reduction activity) of the fuel cell electrode (1).

The current-potential curve recorded during the above measurement is shown in FIG. 1.

The fuel cell electrode (1) manufactured in Example 1 had an oxygen reduction onset potential of 0.9 V (vs. NHE) and was found to have high oxygen reduction activity.

(Ionization Potential)

The ionization potential of the metal oxide electrocatalyst (1) was measured using photoelectron spectrometer MODEL AC-2 manufactured by RIKEN KEIKI Co., Ltd. The ionization potential obtained is set forth in Table 1. The measurement method is described below.

The metal oxide electrocatalyst (1) was put and spread on a UV irradiation area of a sample table of the measurement apparatus using a spatula. Scanning was made while the UV excitation energy was raised starting from 4.5 eV to 5.7 eV under the following conditions. Some electrocatalysts did not show the photoelectron emission threshold at 4.5 to 5.7 eV. In such cases, scanning was made while raising the excitation energy from 3.4 eV minimum to 6.2 eV maximum.

Light energy: 500 nW
Counting time: 15 seconds
Scanning interval: 0.1 eV

The photoelectrons emitted by the excitation were measured, and a graph was made with the normalized photoelectron yield (Yield^n) on the vertical axis and the excitation energy (eV) on the horizontal axis. Herein, the normalized photoelectron yield (Yield^n) indicates a photoelectron yield per unit light energy, multiplied by the factor n. The factor n was 0.5. The excitation energy before the electron emission started, and that after the electron emission started were determined with the apparatus. The graph is set forth in FIG. 25. The photoelectron emission threshold was obtained as the ionization potential from the graph. The ionization potential is shown in Table 1.

(X-Ray Diffractometry)

The metal oxide electrocatalyst (1) was analyzed by X-ray diffractometry using Rotor Flex manufactured by Rigaku Denki Co., Ltd.

FIG. 2 shows an XRD spectrum of the sample. The electrocatalyst was identified to be monoclinic niobium pentoxide ($Nb_2O_5$).

(BET Specific Surface Area)

The BET specific surface areas of the starting material niobium dioxide ($NbO_2$) and the niobium pentoxide ($Nb_2O_5$) were measured using Micromeritics Gemini 2360 manufactured by Shimadzu Corporation.

The BET specific surface areas of the starting material niobium dioxide ($NbO_2$) and the niobium pentoxide ($Nb_2O_5$) were 0.1 m²/g and 0.5 m²/g, respectively.

The niobium pentoxide ($Nb_2O_5$) was found to have a larger BET specific surface area than the starting material niobium dioxide ($NbO_2$).

Example 2

Production of Metal Oxide Electrocatalyst

The procedures of Example 1 were repeated except that the calcination temperature was changed from 1000° C. to 800° C. and the calcination time was changed from 2 hours to 1 minute, thereby obtaining 5.3 g of niobium oxide. The niobium oxide was sufficiently crushed in a mortar to give a metal oxide electrocatalyst (2).

(Production of Fuel Cell Electrode)

A fuel cell electrode (2) was produced in the same manner as in Example 1 except that the metal oxide electrocatalyst (1) was replaced by the metal oxide electrocatalyst (2).

(Evaluation of Oxygen Reduction Activity)

The oxygen reduction activity was evaluated in the same manner as in Example 1 except that the fuel cell electrode (1) was replaced by the fuel cell electrode (2).

The current-potential curve recorded during the measurement is shown in FIG. 3.

The fuel cell electrode (2) manufactured in Example 2 had an oxygen reduction onset potential of 0.9 V (vs. NHE) and was found to have high oxygen reduction activity.

(Ionization Potential)

The ionization potential was measured in the same manner as in Example 1 except that the metal oxide electrocatalyst (1) was replaced by the metal oxide electrocatalyst (2). The ionization potential is shown in Table 1.

(X-Ray Diffractometry)

The X-ray diffractometry was performed in the same manner as in Example 1 except that the metal oxide electrocatalyst (1) was replaced by the metal oxide electrocatalyst (2).

FIG. 4 shows an XRD spectrum of the sample. The electrocatalyst was identified to be orthorhombic niobium pentoxide ($Nb_2O_5$).

(BET Specific Surface Area)

The BET specific surface areas of the starting material niobium dioxide ($NbO_2$) and the niobium pentoxide ($Nb_2O_5$) were measured in the same manner as in Example 1.

The BET specific surface areas of the starting material niobium dioxide ($NbO_2$) and the niobium pentoxide ($Nb_2O_5$) were 0.1 m²/g and 1.1 m²/g, respectively.

The niobium pentoxide ($Nb_2O_5$) was found to have a larger BET specific surface area than the starting material niobium dioxide ($NbO_2$).

Example 3

Production of Metal Oxide Electrocatalyst

The procedures of Example 1 were repeated except that 5.0 g of the niobium dioxide ($NbO_2$) powder (purity: 99.9%, manufactured by Kojundo Chemical Lab. Co., Ltd.) was replaced by 5.0 g of dititanium trioxide ($Ti_2O_3$) powder (manufactured by Wako Pure Chemical Industries Ltd.), thereby obtaining 5.6 g of titanium oxide. The titanium oxide was sufficiently crushed in a mortar to give a metal oxide electrocatalyst (3).

(Production of Fuel Cell Electrode)

A fuel cell electrode (3) was produced in the same manner as in Example 1 except that the metal oxide electrocatalyst (1) was replaced by the metal oxide electrocatalyst (3).

(Evaluation of Oxygen Reduction Activity)

The oxygen reduction activity was evaluated in the same manner as in Example 1 except that the fuel cell electrode (1) was replaced by the fuel cell electrode (3).

The current-potential curve recorded during the measurement is shown in FIG. 5.

The fuel cell electrode (3) manufactured in Example 3 had an oxygen reduction onset potential of 0.8 V (vs. NHE) and was found to have high oxygen reduction activity.

(Ionization Potential)

The ionization potential was measured in the same manner as in Example 1 except that the metal oxide electrocatalyst (1) was replaced by the metal oxide electrocatalyst (3). The ionization potential is shown in Table 1.

(X-Ray Diffractometry)

The X-ray diffractometry was performed in the same manner as in Example 1 except that the metal oxide electrocatalyst (1) was replaced by the metal oxide electrocatalyst (3).

FIG. 6 shows an XRD spectrum of the sample. The electrocatalyst was identified to be rutile titanium oxide ($TiO_2$).

(BET Specific Surface Area)

The BET specific surface areas of the starting material dititanium trioxide ($Ti_2O_3$) and the titanium oxide ($TiO_2$) were measured in the same manner as in Example 1.

The BET specific surface areas of the starting material dititanium trioxide ($Ti_2O_3$) and the titanium oxide ($TiO_2$) were 0.2 $m^2/g$ and 0.3 $m^2/g$, respectively. The titanium oxide ($TiO_2$) was found to have a larger BET specific surface area than the starting material dititanium trioxide ($Ti_2O_3$).

Example 4

Production of Metal Oxide Electrocatalyst

The procedures of Example 1 were repeated except that the calcination temperature was changed from 1000° C. to 800° C., thereby obtaining 5.3 g of niobium oxide. The niobium oxide was sufficiently crushed in a mortar to give a metal oxide electrocatalyst (4).

(Production of Fuel Cell Electrode)

A fuel cell electrode (4) was produced in the same manner as in Example 1 except that the metal oxide electrocatalyst (1) was replaced by the metal oxide electrocatalyst (4).

(Evaluation of Oxygen Reduction Activity)

The oxygen reduction activity was evaluated in the same manner as in Example 1 except that the fuel cell electrode (1) was replaced by the fuel cell electrode (4).

The current-potential curve recorded during the measurement is shown in FIG. 13.

The fuel cell electrode (4) manufactured in Example 4 had an oxygen reduction onset potential of 0.9 V (vs. NHE) and was found to have high oxygen reduction activity.

(Ionization Potential)

The ionization potential was measured in the same manner as in Example 1 except that the metal oxide electrocatalyst (1) was replaced by the metal oxide electrocatalyst (4). The ionization potential is shown in Table 1.

(X-Ray Diffractometry)

The X-ray diffractometry was performed in the same manner as in Example 1 except that the metal oxide electrocatalyst (1) was replaced by the metal oxide electrocatalyst (4).

FIG. 14 shows an XRD spectrum of the sample. The electrocatalyst was identified to be a mixture of monoclinic niobium oxide and orthorhombic niobium oxide.

(BET Specific Surface Area)

The BET specific surface areas of the starting material niobium dioxide ($NbO_2$) and the niobium pentoxide ($Nb_2O_5$) obtained were measured in the same manner as in Example 1.

The BET specific surface areas of the starting material niobium dioxide ($NbO_2$) and the niobium oxide obtained were 0.1 $m^2/g$ and 0.6 $m^2/g$, respectively.

The niobium oxide obtained was found to have a larger BET specific surface area than the starting material niobium dioxide ($NbO_2$).

Example 5

Production of Metal Oxide Electrocatalyst

The procedures of Example 1 were repeated except that the calcination temperature was changed from 1000° C. to 600° C., thereby obtaining 5.3 g of niobium oxide. The niobium oxide was sufficiently crushed in a mortar to give a metal oxide electrocatalyst (5).

(Production of Fuel Cell Electrode)

A fuel cell electrode (5) was produced in the same manner as in Example 1 except that the metal oxide electrocatalyst (1) was replaced by the metal oxide electrocatalyst (5).

(Evaluation of Oxygen Reduction Activity)

The oxygen reduction activity was evaluated in the same manner as in Example 1 except that the fuel cell electrode (1) was replaced by the fuel cell electrode (5).

The current-potential curve recorded during the measurement is shown in FIG. 15.

The fuel cell electrode (5) manufactured in Example 5 had an oxygen reduction onset potential of 0.8 V (vs. NHE) and was found to have high oxygen reduction activity.

(Ionization Potential)

The ionization potential was measured in the same manner as in Example 1 except that the metal oxide electrocatalyst (1) was replaced by the metal oxide electrocatalyst (5). The ionization potential is shown in Table 1.

(X-Ray Diffractometry)

The X-ray diffractometry was performed in the same manner as in Example 1 except that the metal oxide electrocatalyst (1) was replaced by the metal oxide electrocatalyst (5).

FIG. 16 shows an XRD spectrum of the sample. The electrocatalyst was identified to be monoclinic niobium oxide.

(BET Specific Surface Area)

The BET specific surface areas of the starting material niobium dioxide ($NbO_2$) and the niobium oxide obtained were measured in the same manner as in Example 1.

The BET specific surface areas of the starting material niobium dioxide ($NbO_2$) and the niobium oxide obtained were 0.1 $m^2/g$ and 1.3 $m^2/g$, respectively.

The niobium oxide obtained was found to have a larger BET specific surface area than the starting material niobium dioxide ($NbO_2$).

Comparative Example 1

Production of Electrode

An electrode was produced in the same manner as in Example 1 except that the metal oxide electrocatalyst (1) was replaced by niobium pentoxide ($Nb_2O_5$) powder (purity: 99.9%, manufactured by Kojundo Chemical Lab. Co., Ltd.).

(Evaluation of Oxygen Reduction Activity)

The oxygen reduction activity was evaluated in the same manner as in Example 1.

The current-potential curve recorded during the measurement is shown in FIG. 7.

The electrode had an oxygen reduction onset potential of 0.3 V (vs. NHE) and was found to have low oxygen reduction activity.

(Ionization Potential)

The ionization potential was measured in the same manner as in Example 1 except that the metal oxide electrocatalyst (1) was replaced by the niobium pentoxide ($Nb_2O_5$) powder (purity: 99.9%, manufactured by Kojundo Chemical Lab. Co., Ltd.). The ionization potential is shown in Table 1.

(X-Ray Diffractometry)

The X-ray diffractometry of the niobium pentoxide ($Nb_2O_5$) powder (purity: 99.9%, manufactured by Kojundo Chemical Lab. Co., Ltd.) was performed in the same manner as in Example 1.

FIG. 8 shows an XRD spectrum of the diniobium pentoxide ($Nb_2O_5$) powder (purity: 99.9%, manufactured by Kojundo Chemical Lab. Co., Ltd.).

The diniobium pentoxide ($Nb_2O_5$) powder (purity: 99.9%, manufactured by Kojundo Chemical Lab. Co., Ltd.) was identified to be orthorhombic.

(BET Specific Surface Area)

The BET specific surface area of the niobium pentoxide ($Nb_2O_5$) powder was measured in the same manner as in Example 1.

The BET specific surface area of the niobium pentoxide ($Nb_2O_5$) powder was 5.5 $m^2/g$.

Comparative Example 2

Production of Electrode

An electrode was produced in the same manner as in Example 1 except that the metal oxide electrocatalyst (1) was replaced by titanium oxide ($TiO_2$) powder (SUPER-TITANIA F1 manufactured by SHOWA DENKO K.K.) obtained without changing the valence.

(Evaluation of Oxygen Reduction Activity)

The oxygen reduction activity was evaluated in the same manner as in Example 1.

The current-potential curve recorded during the measurement is shown in FIG. 9.

The electrode had an oxygen reduction onset potential of 0.3 V (vs. NHE) and was found to have low oxygen reduction activity.

(Ionization Potential)

The ionization potential was measured in the same manner as in Example 1 except that the metal oxide electrocatalyst (1) was replaced by the titanium oxide ($TiO_2$) powder (SUPER-TITANIA F1 manufactured by SHOWA DENKO K.K.). The ionization potential is shown in Table 1.

(X-Ray Diffractometry)

The X-ray diffractometry of the titanium oxide ($TiO_2$) powder (SUPER-TITANIA F1 manufactured by SHOWA DENKO K.K.) was performed in the same manner as in Example 1.

FIG. 10 shows an XRD spectrum of the titanium oxide ($TiO_2$) powder (SUPER-TITANIA F1 manufactured by SHOWA DENKO K.K.).

The titanium oxide ($TiO_2$) powder (SUPER-TITANIA F1 manufactured by SHOWA DENKO K.K.) was identified to be a mixture of anatase titanium oxide and rutile titanium oxide.

(BET Specific Surface Area)

The BET specific surface area of the titanium oxide ($TiO_2$) powder was measured in the same manner as in Example 1.

The BET specific surface area of the titanium oxide ($TiO_2$) powder was 21 $m^2/g$.

Comparative Example 3

Production of Metal Oxide

The procedures of Example 1 were repeated except that 5.0 g of niobium dioxide ($NbO_2$) powder (purity: 99.9%, manufactured by Kojundo Chemical Lab. Co., Ltd.) was replaced by 5.0 g of niobium pentoxide ($Nb_2O_5$) powder (purity: 99.9%, manufactured by Kojundo Chemical Lab. Co., Ltd.), thereby obtaining 5.0 g of niobium oxide. The niobium oxide was crushed in a mortar.

(Production of Electrode)

An electrode was produced in the same manner as in Example 1 except that the metal oxide electrocatalyst (1) was replaced by the crushed niobium oxide obtained above.

(Evaluation of Oxygen Reduction Activity)

The oxygen reduction activity was evaluated in the same manner as in Example 1.

The current-potential curve recorded during the measurement is shown in FIG. 11.

The electrode had an oxygen reduction onset potential of 0.3 V (vs. NHE) and was found to have low oxygen reduction activity.

(Ionization Potential)

The ionization potential was measured in the same manner as in Example 1 except that the metal oxide electrocatalyst (1) was replaced by the crushed niobium oxide. The ionization potential is shown in Table 1.

(X-Ray Diffractometry)

The X-ray diffractometry of the niobium oxide was performed in the same manner as in Example 1.

FIG. 12 shows an XRD spectrum of the niobium oxide.

The niobium oxide was identified to be monoclinic niobium pentoxide ($Nb_2O_5$).

(BET Specific Surface Area)

The BET specific surface area of the niobium pentoxide ($Nb_2O_5$) powder was measured in the same manner as in Example 1.

The BET specific surface area of the niobium pentoxide ($Nb_2O_5$) powder was 3.5 $m^2/g$.

Comparative Example 4

Production of Metal Oxide

The procedures of Example 1 were repeated except that 5.0 g of the niobium dioxide ($NbO_2$) powder (purity: 99.9%, manufactured by Kojundo Chemical Lab. Co., Ltd.) was replaced by 5.0 g of a titanium tetrachloride ($TiCl_4$) solution (manufactured by Wako Pure Chemical Industries Ltd.), thereby obtaining 1.6 g of titanium oxide. The titanium oxide was crushed in a mortar.

(Production of Electrode)

An electrode was produced in the same manner as in Example 1 except that the metal oxide electrocatalyst (1) was replaced by the crushed titanium oxide obtained above.

(Evaluation of Oxygen Reduction Activity)

The oxygen reduction activity was evaluated in the same manner as in Example 1.

The current-potential curve recorded during the measurement is shown in FIG. 17.

The electrode had an oxygen reduction onset potential of 0.3 V (vs. NHE) and was found to have low oxygen reduction activity.

(Ionization Potential)

The ionization potential was measured in the same manner as in Example 1 except that the metal oxide electrocatalyst (1) was replaced by the crushed titanium oxide. The ionization potential is shown in Table 1.

(X-Ray Diffractometry)

The X-ray diffractometry of the titanium oxide was performed in the same manner as in Example 1.

FIG. 18 shows an XRD spectrum of the titanium oxide.

The titanium oxide was identified to be rutile titanium oxide.

(BET Specific Surface Area)

The BET specific surface area of the titanium oxide powder was measured in the same manner as in Example 1.

The BET specific surface area of the titanium oxide powder was $0.4 \, m^2/g$.

Comparative Example 5

Production of Metal Oxide

The procedures of Example 1 were repeated except that 5.0 g of the niobium dioxide ($NbO_2$) powder (purity: 99.9%, manufactured by Kojundo Chemical Lab. Co., Ltd.) was replaced by 5.0 g of niobium pentachloride ($NbCl_5$) (manufactured by Wako Pure Chemical Industries Ltd.), thereby obtaining 2.4 g of niobium oxide. The niobium oxide was crushed in a mortar.

(Production of Electrode)

An electrode was produced in the same manner as in Example 1 except that the metal oxide electrocatalyst (1) was replaced by the crushed niobium oxide obtained above.

(Evaluation of Oxygen Reduction Activity)

The oxygen reduction activity was evaluated in the same manner as in Example 1.

The current-potential curve recorded during the measurement is shown in FIG. 19.

The electrode had an oxygen reduction onset potential of 0.3 V (vs. NHE) and was found to have low oxygen reduction activity.

(Ionization Potential)

The ionization potential was measured in the same manner as in Example 1 except that the metal oxide electrocatalyst (1) was replaced by the crushed niobium oxide. The ionization potential is shown in Table 1.

(X-Ray Diffractometry)

The X-ray diffractometry of the niobium oxide was performed in the same manner as in Example 1.

FIG. 20 shows an XRD spectrum of the niobium oxide.

The niobium oxide was identified to be monoclinic niobium oxide.

(BET Specific Surface Area)

The BET specific surface area of the niobium oxide powder was measured in the same manner as in Example 1.

The BET specific surface area of the niobium oxide powder was $1.9 \, m^2/g$.

Comparative Example 6

Production of Metal Oxide

The procedures of Example 1 were repeated except that 5.0 g of the niobium dioxide ($NbO_2$) powder (purity: 99.9%, manufactured by Kojundo Chemical Lab. Co., Ltd.) was replaced by 5.0 g of niobium pentachloride ($NbCl_5$) (manufactured by Wako Pure Chemical Industries Ltd.) and the calcination temperature was changed from 1000° C. to 800° C., thereby obtaining 2.4 g of niobium oxide. The niobium oxide was crushed in a mortar.

(Production of Electrode)

An electrode was produced in the same manner as in Example 1 except that the metal oxide electrocatalyst (1) was replaced by the crushed niobium oxide obtained above.

(Evaluation of Oxygen Reduction Activity)

The oxygen reduction activity was evaluated in the same manner as in Example 1.

The current-potential curve recorded during the measurement is shown in FIG. 21.

The electrode had an oxygen reduction onset potential of 0.3 V (vs. NHE) and was found to have low oxygen reduction activity.

(Ionization Potential)

The ionization potential was measured in the same manner as in Example 1 except that the metal oxide electrocatalyst (1) was replaced by the crushed niobium oxide. The ionization potential is shown in Table 1.

(X-Ray Diffractometry)

The X-ray diffractometry of the niobium oxide was performed in the same manner as in Example 1.

FIG. 22 shows an XRD spectrum of the niobium oxide.

The niobium oxide was identified to be orthorhombic niobium oxide.

(BET Specific Surface Area)

The BET specific surface area of the niobium oxide powder was measured in the same manner as in Example 1.

The BET specific surface area of the niobium oxide powder was $2.9 \, m^2/g$.

Comparative Example 7

Production of Metal Oxide

The procedures of Example 1 were repeated except that 5.0 g of the niobium dioxide ($NbO_2$) powder (purity: 99.9%, manufactured by Kojundo Chemical Lab. Co., Ltd.) was replaced by 5.0 g of niobium pentachloride ($NbCl_5$) (manufactured by Wako Pure Chemical Industries Ltd.) and the calcination temperature was changed from 1000° C. to 600° C., thereby obtaining 2.4 g of niobium oxide. The niobium oxide was crushed in a mortar.

(Production of Electrode)

An electrode was produced in the same manner as in Example 1 except that the metal oxide electrocatalyst (1) was replaced by the crushed niobium oxide obtained above.

(Evaluation of Oxygen Reduction Activity)

The oxygen reduction activity was evaluated in the same manner as in Example 1.

The current-potential curve recorded during the measurement is shown in FIG. 23.

The electrode had an oxygen reduction onset potential of 0.3 V (vs. NHE) and was found to have low oxygen reduction activity.

(Ionization Potential)

The ionization potential was measured in the same manner as in Example 1 except that the metal oxide electrocatalyst (1) was replaced by the crushed niobium oxide. The ionization potential is shown in Table 1.

(X-Ray Diffractometry)

The X-ray diffractometry of the niobium oxide was performed in the same manner as in Example 1.

FIG. 24 shows an XRD spectrum of the niobium oxide.

The niobium oxide was identified to be a mixture of orthorhombic niobium oxide and monoclinic niobium oxide.

(BET Specific Surface Area)

The BET specific surface area of the niobium oxide powder was measured in the same manner as in Example 1.

The BET specific surface area of the niobium oxide powder was 5.1 m$^2$/g.

TABLE 1

| | Ionization potential (eV) |
|---|---|
| Electrocatalyst of Example 1 | 5.23 |
| Electrocatalyst of Example 2 | 5.21 |
| Electrocatalyst of Example 3 | 5.15 |
| Electrocatalyst of Example 4 | 5.21 |
| Electrocatalyst of Example 5 | 5.18 |
| Electrocatalyst of Comparative Example 1 | 5.76 |
| Electrocatalyst of Comparative Example 2 | 5.80 |
| Electrocatalyst of Comparative Example 3 | 5.70 |
| Electrocatalyst of Comparative Example 4 | 5.86 |
| Electrocatalyst of Comparative Example 5 | 5.81 |
| Electrocatalyst of Comparative Example 6 | 5.68 |
| Electrocatalyst of Comparative Example 7 | 5.70 |

The invention claimed is:

1. A metal oxide electrocatalyst that comprises a metal oxide (Y) obtained by heat treating a metal compound (X) under an oxygen-containing atmosphere,
the valence of a metal in the metal compound (X) being smaller than the valence of the metal in the metal oxide (Y), the metal oxide electrocatalyst having an ionization potential in the range of 4.9 to 5.5 eV.

2. The metal oxide electrocatalyst according to claim 1, wherein the metal element forming the metal oxide (Y) is one selected from the group consisting of niobium, titanium, tantalum and zirconium.

3. The metal oxide electrocatalyst according to claim 1, wherein the metal element forming the metal oxide (Y) is niobium or titanium.

4. The metal oxide electrocatalyst according to claim 1, wherein the metal compound (X) is a metal oxide.

5. The metal oxide electrocatalyst according to claim 1, wherein the metal compound (X) is niobium dioxide (NbO$_2$) and the metal oxide (Y) is niobium pentoxide (Nb$_2$O$_5$).

6. The metal oxide electrocatalyst according to claim 1, wherein the metal oxide (Y) is orthorhombic, monoclinic or cubic niobium pentoxide (Nb$_2$O$_5$).

7. The metal oxide electrocatalyst according to claim 1, wherein the metal compound (X) is dititanium trioxide (Ti$_2$O$_3$) and the metal oxide (Y) is titanium oxide (TiO$_2$).

8. The metal oxide electrocatalyst according to claim 1, wherein the metal oxide (Y) is rutile titanium oxide (TiO$_2$).

9. The metal oxide electrocatalyst according to claim 1, wherein the metal oxide electrocatalyst is powder.

10. The metal oxide electrocatalyst according to claim 1, wherein the metal oxide electrocatalyst has a BET specific surface area in the range of 0.1 to 100 m$^2$/g.

11. The metal oxide electrocatalyst according to claim 1, wherein the BET specific surface area of the metal oxide electrocatalyst is larger than the BET specific surface area of powder of the metal compound (X).

12. A catalyst layer comprising the metal oxide electrocatalyst described in claim 1.

13. The catalyst layer according to claim 12, which further comprises electron conductive particles.

14. A membrane electrode assembly comprising a cathode, an anode and an electrolyte membrane arranged between the cathode and the anode, wherein the cathode has the catalyst layer described in claim 12.

15. A fuel cell comprising the membrane electrode assembly described in claim 14.

16. The fuel cell according to claim 15, which is a polymer electrolyte fuel cell.

17. A process for producing the metal oxide electrocatalyst as described in claim 1, which comprises a step of heat treating a metal compound (X) in an oxygen-containing atmosphere to obtain a metal oxide (Y).

18. The process according to claim 17, wherein the temperature in the heat treatment is in the range of 400 to 1200° C.

19. The process according to claim 17, which further comprises a step of crushing the metal oxide (Y).

* * * * *